US012715306B2

(12) United States Patent
Murphy et al.

(10) Patent No.: US 12,715,306 B2
(45) Date of Patent: Aug. 25, 2026

(54) MICRO-MOBILITY FLEET VEHICLE POWERTRAIN SYSTEMS AND METHODS

(71) Applicant: Lyft, Inc., San Francisco, CA (US)

(72) Inventors: Conrad Xavier Murphy, San Francisco, CA (US); Chen-Yu Lin, San Francisco, CA (US); Nikola Popov, San Francisco, CA (US); Simon Roy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 2 days.

(21) Appl. No.: 18/624,009

(22) Filed: Apr. 1, 2024

(65) Prior Publication Data

US 2024/0246426 A1 Jul. 25, 2024

Related U.S. Application Data

(63) Continuation of application No. 16/716,493, filed on Dec. 17, 2019, now Pat. No. 11,945,315.

(51) Int. Cl.

| | |
|---|---|
| ***B60L 15/20*** | (2006.01) |
| ***B60L 50/60*** | (2019.01) |
| ***B60L 58/12*** | (2019.01) |
| ***B62J 99/00*** | (2020.01) |
| ***B62K 19/00*** | (2006.01) |
| ***B62L 5/00*** | (2006.01) |

(Continued)

(52) U.S. Cl.

CPC ........... *B60L 15/2009* (2013.01); *B60L 50/66* (2019.02); *B60L 58/12* (2019.02); *B62J 99/00* (2013.01); *B62K 19/00* (2013.01); *B62L 5/006* (2013.01); *B60L 2200/12* (2013.01); *B60L 2240/12* (2013.01); *B60L 2240/14* (2013.01); *B60L 2240/62* (2013.01); *B60L 2240/68* (2013.01); *B62J 45/20* (2020.02); *B62J 50/20* (2020.02)

(58) Field of Classification Search

CPC . B62K 19/00; B62J 99/00; B62J 50/20; B62J 45/20; B60L 15/2009; B60L 50/66; B60L 2200/12; B60L 2240/14; B60L 2240/62; B60L 2240/68

See application file for complete search history.

(56) References Cited

U.S. PATENT DOCUMENTS 4,313,517 A * 2/1982 Pivar ..................... B62D 61/08 180/206.7
4,558,263 A * 12/1985 Harris ..................... B60L 50/52 318/63

(Continued)

*Primary Examiner* — Alentin Neacsu
*Assistant Examiner* — Michael R Stabley
(74) *Attorney, Agent, or Firm* — Baker Botts L.L.P.

(57) ABSTRACT

A method implemented by one or more processors includes receiving vehicle data associated with an operation of a micromobility vehicle, and determining, based on the vehicle data, a braking action to be performed by the micromobility vehicle. The braking action is configured to effect the operation of the micromobility vehicle. The method further includes identifying, based at least in part on one or more components of a powertrain of the micromobility vehicle, one or more authentication identifiers associated with a secured functionality of the one or more components of the powertrain, and in response to determining that the one or more authentication identifiers satisfies a predetermined condition, causing the micromobility vehicle to perform the braking action.

15 Claims, 14 Drawing Sheets

(51) Int. Cl.
*B62J 45/20* (2020.01)
*B62J 50/20* (2020.01)

(56) References Cited

U.S. PATENT DOCUMENTS

| | | | | |
|---|---|---|---|---|
| 4,844,493 | A * | 7/1989 | Kramer | B62B 3/12<br>250/342 |
| 6,021,862 | A * | 2/2000 | Sharan | B62M 6/45<br>180/216 |
| 6,556,020 | B1 * | 4/2003 | McCabe | G01R 31/389<br>324/426 |
| 8,281,908 | B2 * | 10/2012 | Hudson | F16D 65/78<br>188/264 D |
| 8,457,821 | B2 * | 6/2013 | Shaffer | B60L 53/64<br>180/65.8 |
| 9,037,331 | B2 * | 5/2015 | Taira | B60L 3/102<br>180/6.48 |
| 10,797,497 | B2 * | 10/2020 | Steiner | B60L 53/665 |
| 2008/0270023 | A1 * | 10/2008 | Kumar | B60L 15/2045<br>903/903 |
| 2013/0261832 | A1 * | 10/2013 | Bastien | G06F 1/263<br>700/295 |
| 2019/0375388 | A1 * | 12/2019 | Meister | B60T 8/885 |
| 2020/0220366 | A1 * | 7/2020 | Steiner | H02J 7/0045 |

* cited by examiner

200
Management System
240
Network
250
252
254
256
110a
110b
110c
110d
130b
Public Transportation Status System
242
210a
210b
130a
Carrier
Lyft
8:31 PM
ONLINE
185 Berry St
Mary Ave
Stevens Creek Blvd
Bubb Rd
85
280
284
272
270
286
282
268
280
266
264
262
260
132

MICRO-MOBILITY FLEET VEHICLE POWERTRAIN SYSTEMS AND METHODS

PRIORITY

This application is a continuation of U.S. patent application Ser. No. 16/716,493, filed Dec. 17, 2019, now U.S. Pat. No. 11,945,315, all of which is incorporated herein by reference in their entireties.

TECHNICAL FIELD

One or more embodiments of the present disclosure relate generally to micro-mobility fleet vehicles and more particularly, for example, to systems and methods for a powertrain of a micro-mobility fleet vehicle.

BACKGROUND

Fleet vehicles of a fleet servicer, including battery powered stand-scooters, bicycles, and sit-scooters, typically include a powertrain including one or more batteries, a motor, and a motor controller. The motor controller is typically configured to draw power from the one or more batteries and control operation of the motor to provide motive force to the fleet vehicle based on various contextual control signals and sensor data. The speed, acceleration, and/or torque of the motor is typically controlled by adjusting the power provided by the one or more batteries to the motor. Such configurations may rely on other systems or even the user to brake, modulate, or otherwise control the fleet vehicle based on conditions and/or location of the fleet vehicle, which may be inefficient, reduce performance, reduce user experience, and/or be costly.

Therefore, there is a need in the art for systems and methods for an improved or alternative powertrain of a micro-mobility fleet vehicle, the powertrain providing a relatively wide range of traction control, immobilization, and/or braking features, among others.

SUMMARY

Techniques are disclosed for systems and methods associated with a powertrain for a micro-mobility fleet vehicle. In accordance with one or more embodiments, a micro-mobility fleet vehicle may include at least one drive wheel configured to provide tractive contact between the micro-mobility fleet vehicle and a road surface, an electric motor mechanically coupled to the at least one wheel and configured to provide motive force for the micro-mobility fleet vehicle, a brake resistor configured to provide dynamic braking of the motor, and a motor controller electronically coupling the brake resistor to the motor. The motor controller may be configured to control the motive force provided by the motor using the brake resistor. The motor controller may be configured to limit a speed, power, and/or acceleration of the motor using the brake resistor based on an operational environment of, and/or on a directive received by, the fleet vehicle or through a management system of the fleet vehicle. The motor controller may couple the brake resistor to the motor to provide a relatively wide range of traction control. The micro-mobility fleet vehicle may include a battery electronically coupled to the motor controller. The motor controller may be coupled and/or located adjacent to a back wall of the battery that is disposed between the battery and a rear wheel of the micro-mobility fleet vehicle. First and second frame members may extend along opposing sides of the fleet vehicle in a spaced relationship to define a vehicle frame space therebetween. A front deck may be defined at least partially by the vehicle frame space between the first and second frame members. The brake resistor may be disposed and/or coupled mechanically within the front deck. The battery and motor controller may be at least partially disposed within the vehicle frame space defined between the first and second frame members.

In accordance with one or more embodiments, a micro-mobility fleet vehicle includes a powertrain and at least one wheel in communication with the powertrain. The powertrain may include an electric motor configured to provide motive force for the micro-mobility fleet vehicle, a brake resistor, and a motor controller electronically coupling the brake resistor to the electric motor. The motor controller may be configured to control a motive force output provided by the motor using the brake resistor. The at least one wheel may be mechanically coupled to the electric motor. The motive force output of the electric motor may be based at least partially on a braking parameter of the micro-mobility fleet vehicle. The motor controller may be configured to control one or more dynamic characteristics of the motive force provided by the electric motor for the micro-mobility fleet vehicle using the brake resistor based, at least in part, on an operational environment of the micro-mobility fleet vehicle. The dynamic characteristics may include a speed, power, and/or acceleration of the micro-mobility fleet vehicle. The operational environment may include a location, charge state, and/or traffic congestion associated with the micro-mobility fleet vehicle. The motor controller may be configured to control one or more dynamic characteristics of the micro-mobility fleet vehicle using the brake resistor based, at least in part, on a directive received by the micro-mobility fleet vehicle. The directive may be a fleet servicer directive received from a fleet servicer management system/server. The directive may be a locale specific regulation, such as a speed limit.

In accordance with one or more embodiments, a method includes receiving data associated with an operation of a micro-mobility fleet vehicle, determining a braking action to take on the micro-mobility fleet vehicle based on the received data, and controlling an output of an electric motor using a brake resistor through a powertrain of the micro-mobility fleet vehicle. The powertrain may include the electric motor, the brake resistor, a motor controller electronically coupling the brake resistor to the electric motor, a battery electronically coupled to the motor controller, and a vehicle control unit (VCU) electronically coupled to the motor controller. Controlling an output of the motor may include limiting one or more dynamic characteristics of the micro-mobility fleet vehicle using the brake resistor based on an operational environment of and/or a directive received by the micro-mobility fleet vehicle. Controlling an output of the motor may include providing a traction control characteristic of the micro-mobility fleet vehicle using the brake resistor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sit-scooters, scooters, bicycles, and other micro-mobility fleet vehicles benefit from a distinctive powertrain configuration. The powertrain may include an electric motor, a brake resistor configured to provide dynamic braking of the motor, and a motor controller electronically coupling the brake resistor to the motor. The motor controller may be configured to control an output of the motor using the brake resistor. The motor controller may be configured to limit a speed, power, and/or acceleration of the motor using the brake resistor based on an operational environment of, and/or on a directive received by, the fleet vehicle. The motor controller may couple the brake resistor to the motor to provide a relatively wide range of traction control. The powertrain may include an anti-tamper feature that requires encrypted verification of at least two elements of the powertrain before power is supplied to, and/or dynamic braking is released from, the motor.

Figure 1:
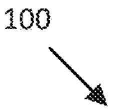
FIG. 1 illustrates a block diagram of a portion of a dynamic transportation matching system including a fleet vehicle in accordance with an embodiment of the disclosure.
Figure 1:
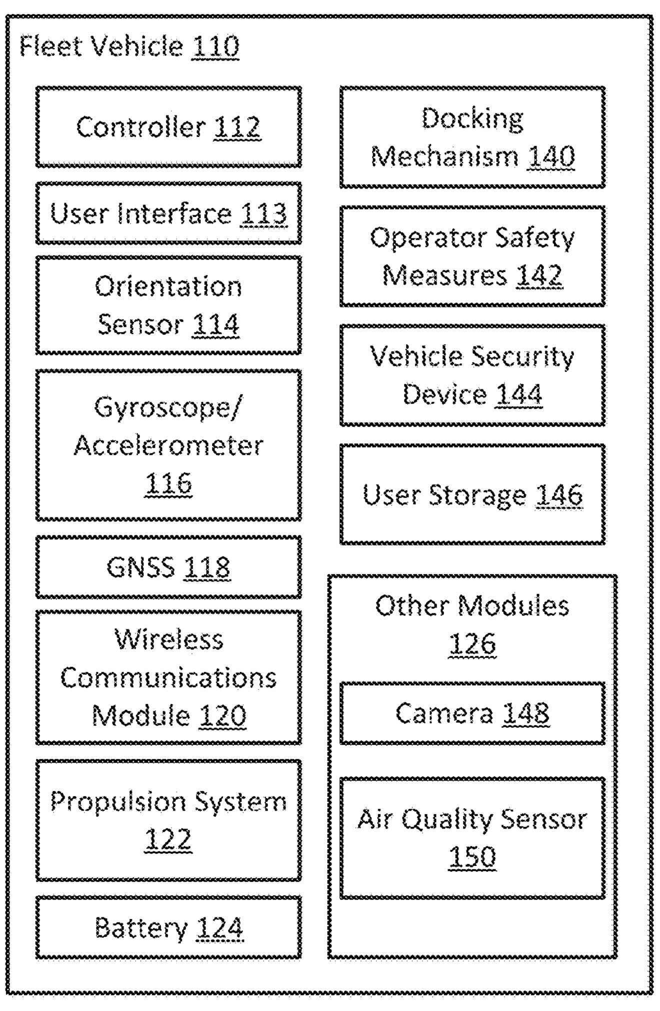
Figure 1:
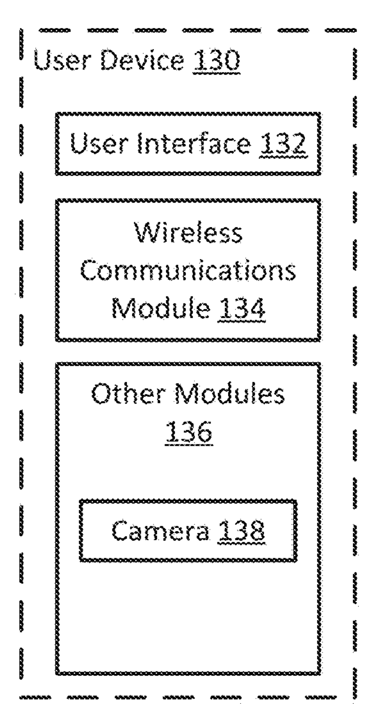

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, ID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium-ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
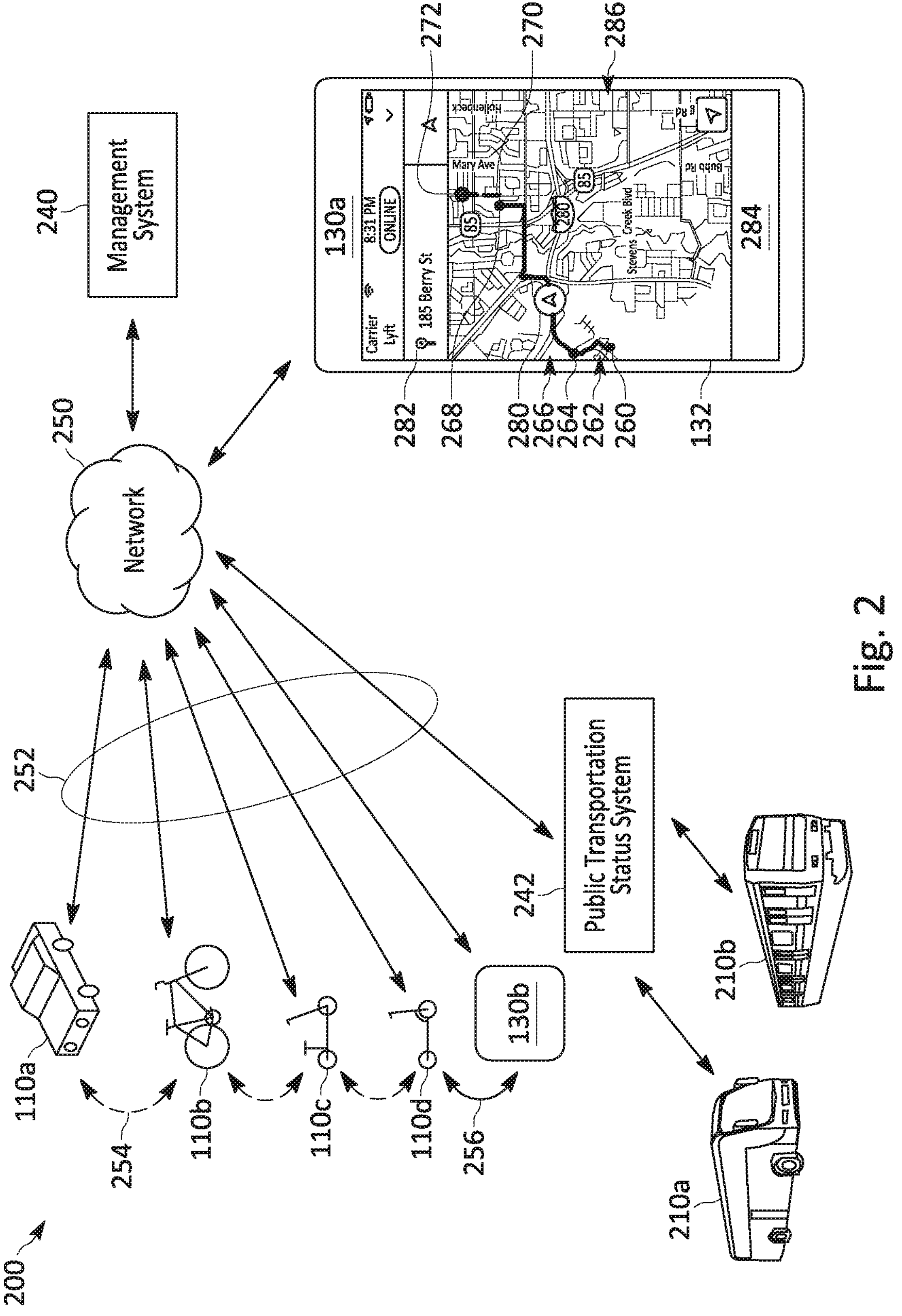
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110*a-d* and user devices 130*a-b* over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210*a*, trains 210*b*, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130*a* to hire or rent one of fleet vehicles 110*a-d* by transmitting a transportation request to management system 240 over WAN 250, allowing management system 240 to poll status of fleet vehicles 110*a-d* and to select one of fleet vehicles 110*a-d* to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130*b*, but where the requestor is able to enable a fleet vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110*a-d*, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110*a-d*, as described herein.

User device 130*a* in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110*b*, 110*c*, or 110*d*) from bus stop 268 to destination 272. Also shown rendered by user interface 132 are present location indicator 280 (indicating a present absolute position of user device 130*a* on street map 486), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130*a*, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
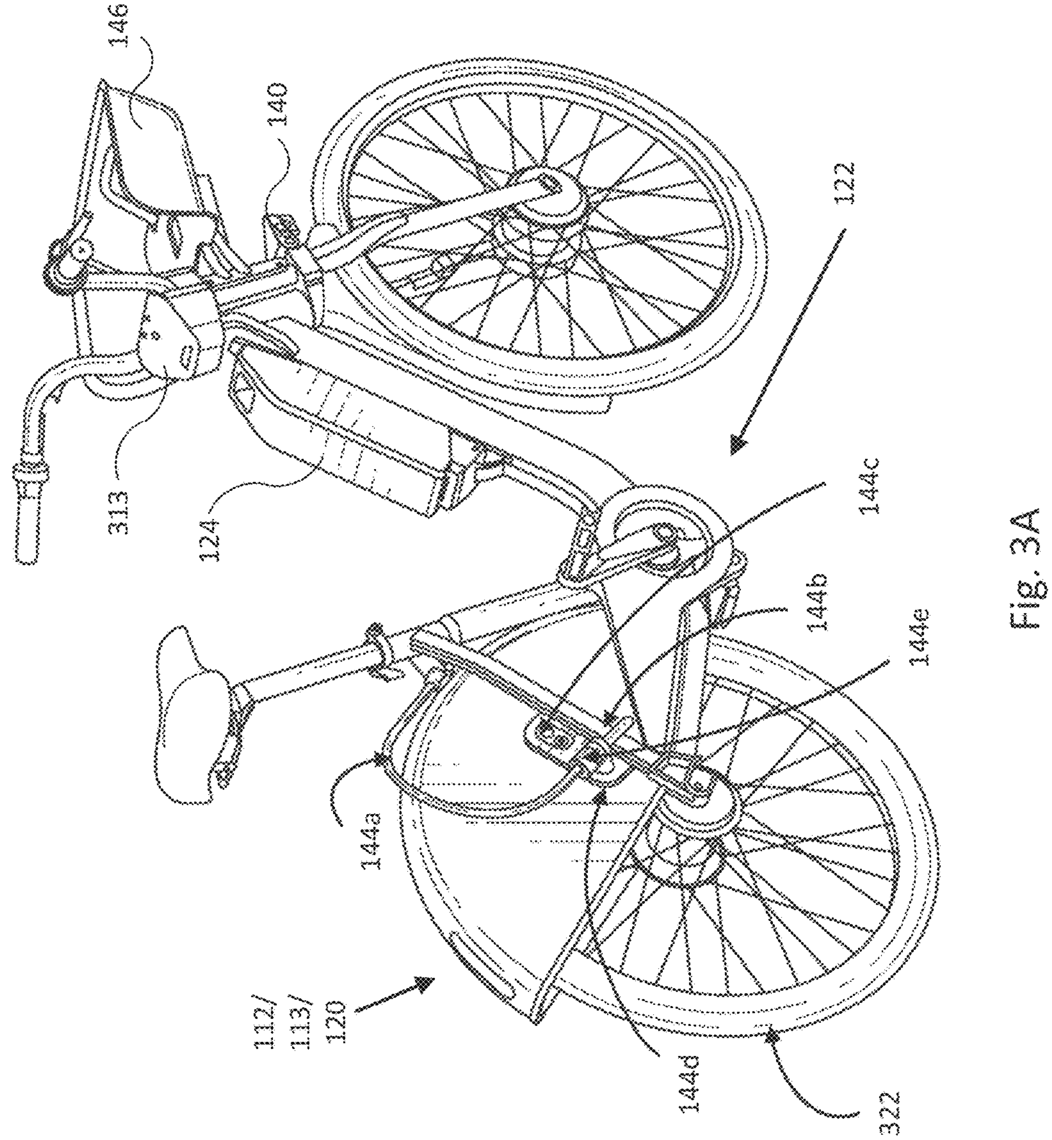
FIGS. 3A-C illustrate diagrams of micro-mobility fleet vehicles for use in a dynamic transportation matching system in accordance with an embodiment of the disclosure.
Figure 3B:
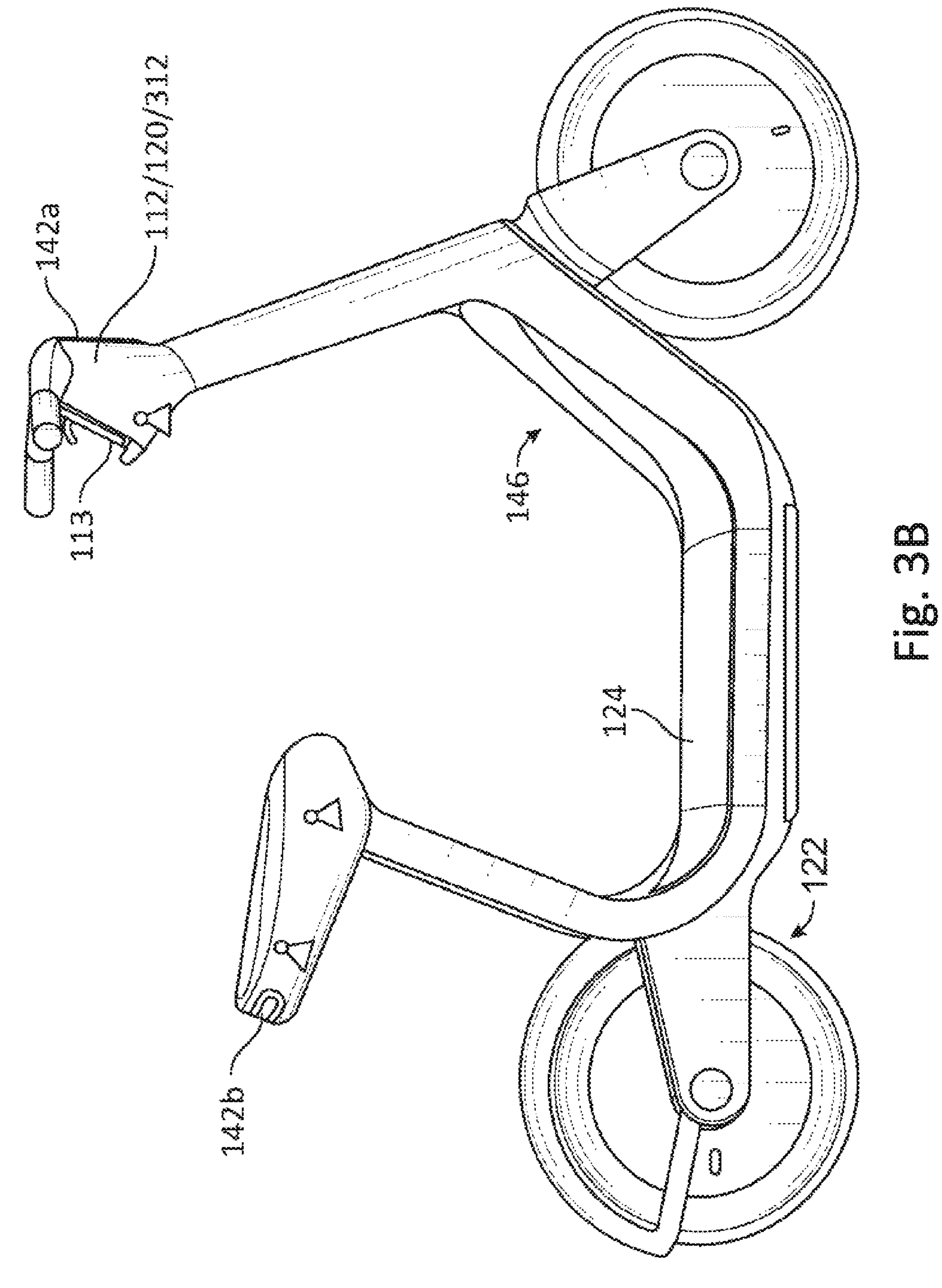
Figure 3C:
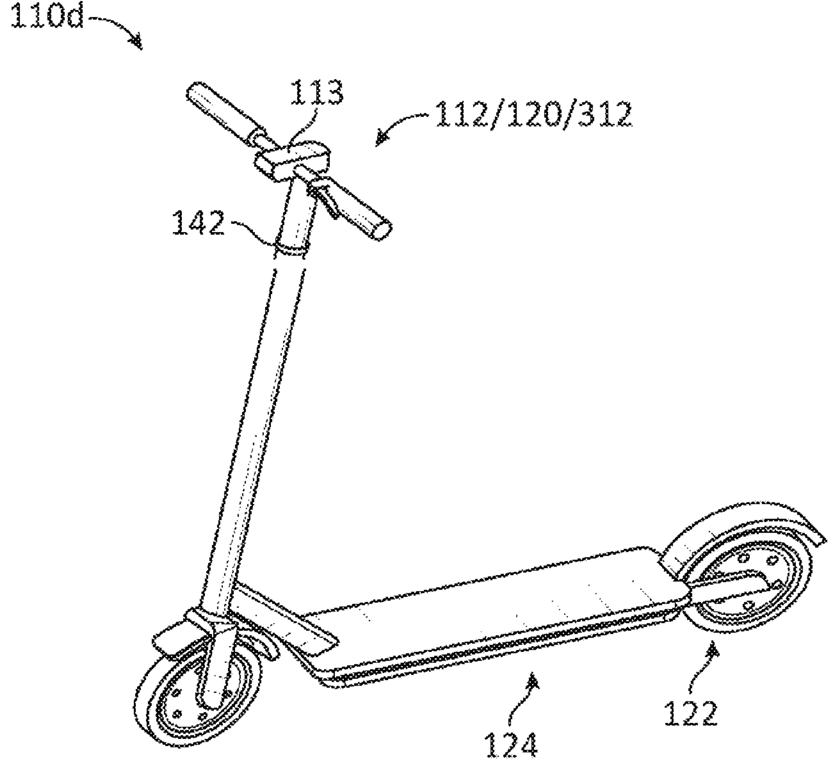

FIGS. 3A-C illustrate diagrams of micro-mobility fleet vehicles 110*b*, 110*c*, and 110*d*, which may be integrated with mobile mesh network provisioning systems in accordance with an embodiment of the disclosure. For example, fleet vehicle 110*b* of FIG. 3A may correspond to a motorized bicycle for hire that is integrated with the various elements of system 100 and may be configured to participate in dynamic transportation matching system 200 of FIG. 2. As shown, fleet vehicle 110*b* includes controller/user interface/wireless communications module 112/113/120 (e.g., integrated with a rear fender of fleet vehicle 110*b*), propulsion system 122 configured to provide motive power to at least one of the wheels (e.g., a rear wheel 322) of fleet vehicle 110*b*, battery 124 for powering propulsion system 122 and/or other elements of fleet vehicle 110*b*, docking mechanism 140 (e.g., a spade lock assembly) for docking fleet vehicle 110*b* at a docking station, user storage 146 implemented as a handlebar basket, and vehicle security device (e.g., an embodiment of vehicle security device 144 of FIG. 1), which may incorporate one or more of a locking cable 144*a*, a pin 144*b* coupled to a free end of locking cable 144*a*, a pin latch/insertion point 144*c*, a frame mount 144*d*, and a cable/pin holster 144*e*, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of fleet vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize fleet vehicle 110*b* by default, thereby requiring a user to transmit a hire request to management system 240 (e.g., via user device 130) to hire fleet vehicle 110*b* before attempting to use fleet vehicle 110*b*. The hire request may identify fleet vehicle 110*b* based on an identifier (e.g., a QR code, a barcode, a serial number, etc.) presented on fleet vehicle 110*b* (e.g., such as by user interface 113 on a rear fender of fleet vehicle 110*b*). Once the hire request is approved (e.g., payment is processed), management system 240 may transmit an unlock signal to fleet vehicle 110*b* (e.g., via network 250). Upon receiving the unlock signal, fleet vehicle 110*b* (e.g., controller 112 of fleet vehicle 110*b*) may release vehicle security device 144 and unlock rear wheel 322 of fleet vehicle 110*b*.

Fleet vehicle 110*c* of FIG. 3B may correspond to a motorized sit-scooter for hire that is integrated with the various elements of system 100 and may be configured to participate in dynamic transportation matching system 200 of FIG. 2. As shown in FIG. 3B, fleet vehicle 110*c* includes many of the same elements as those discussed with respect to fleet vehicle 110*b* of FIG. 3A. For example, fleet vehicle

110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of headlights, programmable light strips, and/or reflective strips.

Fleet vehicle 110*d* of FIG. 3C may correspond to a motorized stand or kick scooter for hire that is integrated with the various elements of system 100 and may be configured to participate in dynamic transportation matching system 200 of FIG. 2. As shown in FIG. 3C, fleet vehicle 110*d* includes many of the same elements as those discussed with respect to fleet vehicle 110*b* of FIG. 3A. For example, fleet vehicle 110*d* may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
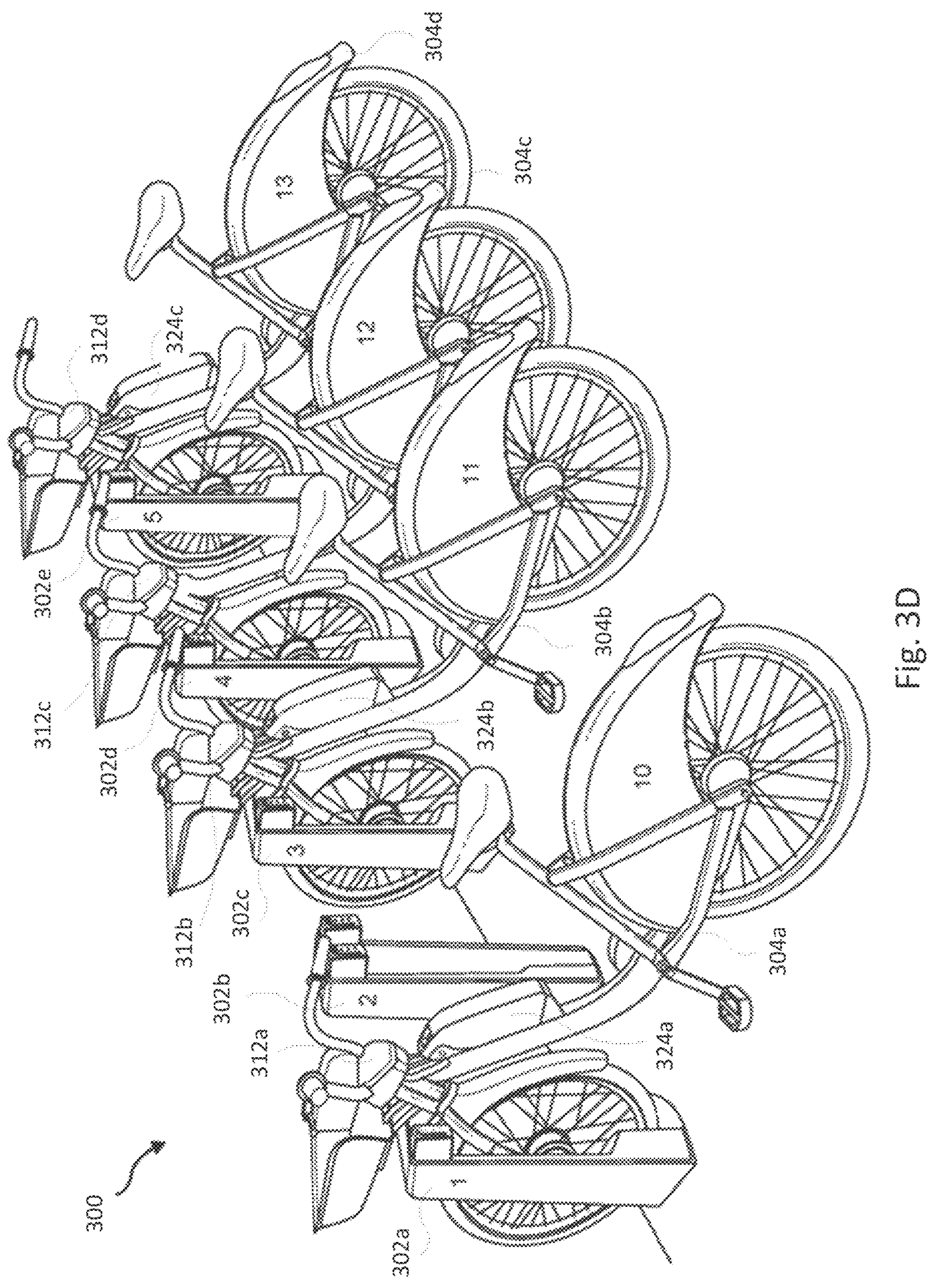
FIG. 3D illustrates a diagram of a docking station for docking fleet vehicles in accordance with an embodiment of the disclosure.

FIG. 3D illustrates a docking station 300 for docking fleet vehicles (e.g., fleet vehicles 110*c*, 110*e*, and 110*g*, etc.) according to one embodiment. As shown, docking station 300 may include multiple bicycle docks, such as docks 302*a*-*e*. In this example, a single fleet vehicle (e.g., any one of electric bicycles 304*a*-*d*) may dock in each of the docks 302*a*-*e* of the docking station 300. Each of the docks 302*a*-*e* may include a lock mechanism for receiving and locking docking mechanism 140 of the electric bicycles 304*a*-*d*. In some embodiments, once a fleet vehicle is docked in a bicycle dock, the dock may be electronically coupled to the fleet vehicle (e.g., controllers 312*a*-*d* of the fleet vehicle) via a link such that the fleet vehicle and the dock may communicate with each other via the link.

A user may use a user device (e.g., user device 130) to hire a fleet vehicle that is docked in one of the bicycle docks 302*a*-*e* by transmitting a hire request to management system 240. Once the hire request is processed, management system 240 may transmit an unlock signal to the electric bicycle docked in the dock and/or the dock via network 250. The dock may automatically unlock the lock mechanism to release the electric bicycle based on the unlock signal. In some embodiments, each of the docks 302*a*-*e* may also be configured to charge batteries (e.g., batteries 324*a*-*c*) of the electric bicycle 304*a*-*d*, respectively, when the electric bicycle 304*a*-*d* are docked at the docks 302*a*-*e*. In some embodiments, docking station 300 may also be configured to transmit information associated with the docking station 300 (e.g., a number of fleet vehicles docked at the docking station 300, charge statuses of the docked fleet vehicles, etc.) to the management system 240.

Figure 4:
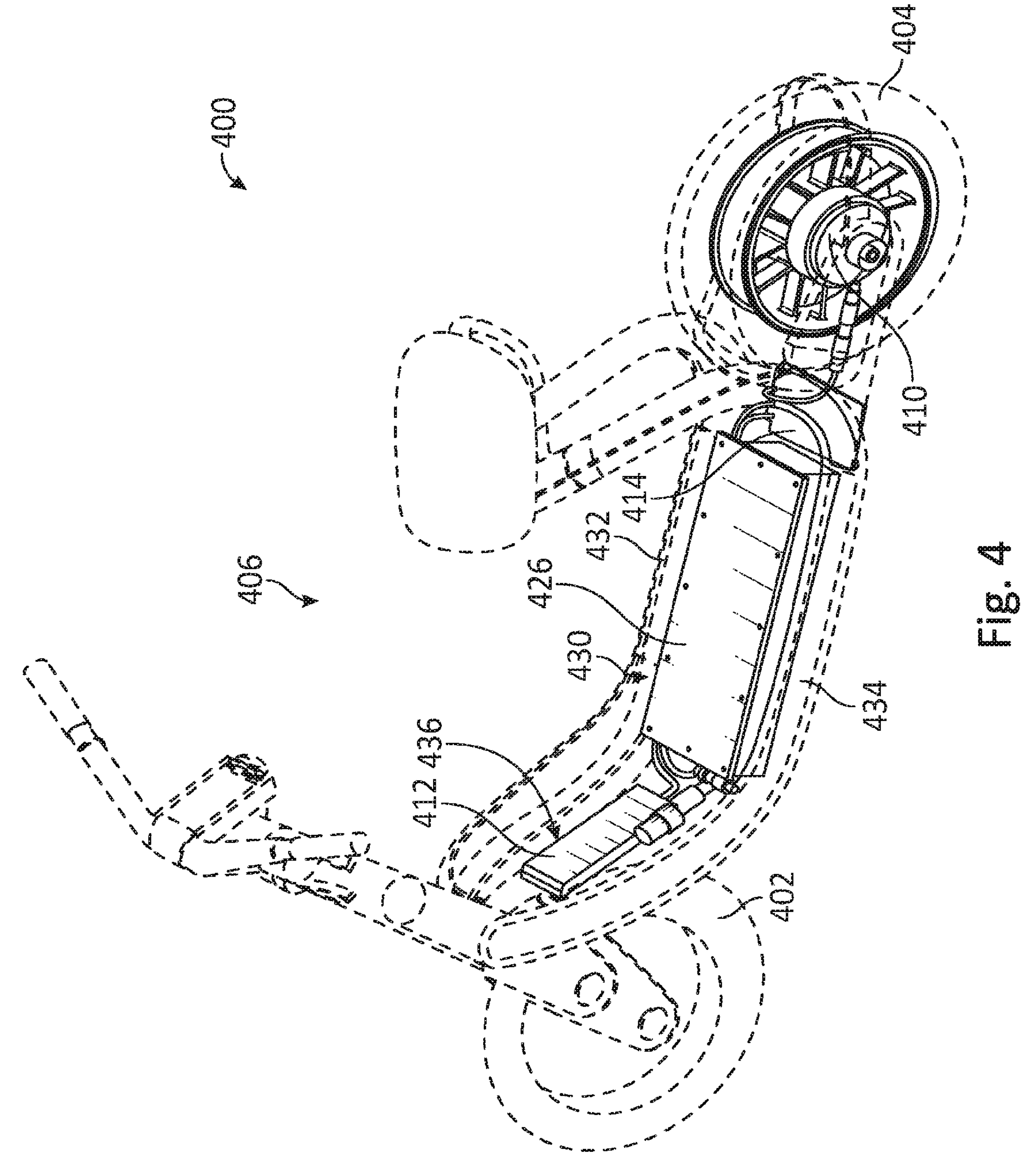
FIG. 4 illustrates a diagram of a micro-mobility fleet vehicle in accordance with an embodiment of the disclosure.

FIG. 4 illustrates a diagram of a micro-mobility fleet vehicle 400 in accordance with an embodiment of the disclosure. In the illustrated embodiment, micro-mobility fleet vehicle 400 is a two-wheeled sit-scooter with a front wheel 402 and a rear wheel 404, though other configurations are contemplated, including bicycles, kick scooters, and the like (e.g., fleet vehicles 110 and 110*a*-*d*, described above). As shown, fleet vehicle 400 includes a power system 406 including an electric motor 410, a brake resistor 412, and a motor controller 414 electronically coupling the brake resistor 412 and to the motor 410. As described herein, "electronically coupling" or "electronically coupled" means electrically coupled (e.g., for power coupling), communicatively coupled (e.g., for sensor data communication), or both electrically coupled and communicatively coupled together. The power system 406 also includes a battery 416 coupled to the motor 410, such as via the motor controller 414. Depending on the application, the battery 416 may include any number or combination of batteries, capacitors, electrical generators, AC power source, or DC power source, among others, electronically coupled to the motor controller 414 to provide electrical power to the motor 410. The battery 416 may be similar to battery 124, described above. For instance, the battery 416 may be a lithium-ion battery, a nickel-cadmium battery, a nickel-metal hydride battery, or a lead acid battery, among others.

The motor 410 may include many configurations. For example, the motor 410 may be a 3-phase motor designed to run on three-phase alternating current (AC) power. In such embodiments, the motor 410 may include a rotor and a stator, with the stator including three pairs of coils spaced around the rotor. In such embodiments, each pair of coils of the motor 510 may be attached to a respective phase of power to set up a rotating magnetic field that spins around the stator at a continuous rate. The moving magnetic field creates a continuously moving and out-of-sync current in the rotor that causes the rotor to continuously rotate as the rotor chases the moving magnetic field of the stator.

The motor 410 may be selected to satisfy one or more requirements of the power system 406. For example, the motor 410 may be selected to achieve a desired acceleration, torque (peak and/or continuous), torque response, speed (RPM), power, weight, size, configuration, or any combination thereof. Exemplary selection criteria may include one or more of the following: level of acceleration based on intended use; level of power based on weight, speed, and/or road grade requirements or specifications; torque response in relation to charge state and ambient temperatures; compatibility with other components of power system 406 (e.g., battery 416, brake resistor 412, motor controller 414, etc.); or sound requirements or specifications, among others. Exemplary requirements or specifications may include one or more of the following: acceleration fast enough to feel confident in car traffic, but not so fast fleet vehicle feels out of place in bike lane; power sufficient to carry a 250 lb. person up a 15% grade at 12-15 mph; consistent torque response regardless of state of charge and ambient temperature (within defined range of operating conditions); effectively silent during operation; top speed of 20 mph on flat ground for all end-users; total weight for the ride (including user/rider and anything the user/rider has, such as groceries, backpack, merchandise, and the like), etc. Depending on the application, the motor 510 may supply a peak torque of between 70 Nm and 100 Nm, such as about 85 Nm, for 10 seconds, though other configurations are contemplated. In some embodiments, the motor 510 may supply a continuous torque of between 30 Nm and 60 Nm, such as about 45 Nm, though other configurations are contemplated.

As described herein, the brake resistor 412 may be configured to produce a braking torque on the motor 410 through electrical resistance, thereby decelerating the motor 410. The braking torque, or dynamic braking, may be created through consumption or absorption of kinetic energy within the system. For instance, the brake resistor 412 may transform kinetic energy in the motor 410 (e.g., in the rotor) into electrical energy or thermal energy through one or more resistors. Depending on the application, the dynamic braking provided by the brake resistor 412 may be rheostatic or regenerative. In rheostatic applications, the consumed energy may be dissipated as heat through one or more rheostatic resistors. In regenerative applications, electrical power may be fed back into the system, such as to recharge the battery 416, one or more capacitors, or the like. In some embodiments, the dynamic braking provided by the brake resistor 412 may be controlled by the motor controller 414. For instance, depending on environment, fleet vehicle status, and/or directives received by the motor controller 414, the motor controller 414 may control the level of dynamic braking applied to the motor 510 during use, as explained in detail below.

The brake resistor 412 may include many configurations. For instance, in some embodiments, the brake resistor 412 may have a low ohmic value and a high-power rating. For instance, the brake resistor 412 may have an ohmic value between 0.25 Ohms and 0.75 Ohms, such as about 0.5 Ohms, though other configurations are contemplated. The brake resistor 412 may have a peak power rating between 1.5 kilowatts (kW) and 3.5 kW, such as about 2.5 kW, though other configurations are contemplated. In rheostatic applications, the brake resistor 412 may include a thermal dissipation assembly to facilitate dissipation of heat. In such embodiments, the heat dissipated by the rheostatic resistors may be transferred to the thermal dissipation assembly through one or more heat sinks or other thermal connection systems.

In some embodiments, the brake resistor 412 may be utilized to control movement of the fleet vehicle 400. For example, the brake resistor 412 may control one or more characteristics of the fleet vehicle's speed, acceleration, deceleration, and/or traction of the fleet vehicle through dynamic braking of the motor 410. For instance, the brake resistor 412 may be utilized to limit a top speed, acceleration, and/or undesired movement of the fleet vehicle, as detailed more fully below. In some embodiments, the brake resistor 412 may be used to aid or replace traditional friction brake systems of the fleet vehicle. For instance, the brake resistor 412 may increase the overall braking force provided by the fleet vehicle's brake system. Additionally, the brake resistor 412 may reduce maintenance costs associated with replacing components of traditional friction brake systems (e.g., discs, rotors, pads, shoes, etc.).

The battery 416 may be selected to satisfy one or more requirements of the power system 406. For example, the battery 416 may be selected to provide a desired power, weight, size, or any combination thereof. In some embodiments, the battery 416 may be configured to provide a desired voltage, amperage, peak power supply, continuous power supply, power over a period of time, or the like. Depending on the application, the battery 416 may be rated at 48 volts (V) and 1700 Watt hours (Wh), with a peak power supply of 2.5 kW and a continuous power supply of 1.5 kW. Other configurations are contemplated. For example, the battery 416 may be rated to supply a continuous power of between 0.5 kW and 2.5 kW and a peak power supply of between 1 kW and 4 kW. The battery 416 may also be rated at greater than 48 V or less than 48 V, and may include a power rating between 1000 Wh and 2500 Wh.

The motor controller 414 may include many configurations governing the performance of the motor 410. For instance, the motor controller 414 may include one or more circuitries for starting and stopping the motor 410, selecting forward or reverse rotation of the motor 410, selecting and regulating the speed of the motor 410, regulating or limiting the torque supplied by the motor 410, and/or protecting against overloads and faults, among others. In some embodiments, the motor controller 414 may include one or more microprocessors or logic devices to intelligently monitor and control the motor 410 and/or other components of the power system 402 (e.g., the brake resistor 414, the battery 416, etc.).

As described herein, the motor controller 414 may be configured to control an output of the motor 410 using the brake resistor 412. For example, the motor controller 414 may be configured to draw power from the battery 416 and control, via the brake resistor 412, operation of the motor 410 to provide motive forces to fleet vehicle 400. As described more fully below, the motor controller 414 may modulate, limit, direct, or otherwise modify operation of the motor 410 via the brake resistor 412. In this manner, the motor controller 414 may provide a relatively wide range of motor control, especially compared to solely adjusting the power provided to the motor 410 by the battery 416. In some embodiments, the motor controller's operational control of the motor 410 using the brake resistor 412 may be based on one or more characteristics of the power system 406 and various contextual control signals and sensor data. For instance, the motor controller 414 may be configured to control operation of the motor 410 using the brake resistor 412 based on the status of the battery 416, the location of the fleet vehicle 400, locale regulations, or the like, as detailed for fully below.

According to one or more embodiments, the motor controller 414 may be configured to control a braking parameter of the fleet vehicle 400 to control one or more dynamic characteristics of the fleet vehicle 400 using the brake resistor 412 based on an operational environment of the fleet vehicle 400. Dynamic characteristics of the fleet vehicle 400 may include a speed, power, power usage or depletion rate, and/or acceleration, among others of the fleet vehicle 400. The operational environment of the fleet vehicle 400 may include a traffic congestion, a location, an anticipated route, terrain along the route, including condition of roads, and inclines and/or declines, temperature (both external and to sub-systems of the fleet vehicle 400 such as controllers, batteries, processors, brake pads, and tires), and/or charge state, among others, of or associated with the fleet vehicle 400. For example, the motor controller 414 may dynamically brake the fleet vehicle 400 using the brake resistor 412 to govern the speed of the fleet vehicle 400 at a top speed. The top speed may be preset or adjusted based on the operational environment of the fleet vehicle 400. For instance, in areas of higher traffic congestion the top speed may be reduced, or vice versa. Additionally, or alternatively, the top speed of fleet vehicle 400 may be set based on whether the fleet vehicle 400 is traveling on a city street (increased top speed) or a sidewalk (reduced top speed). The top speed may also be set based on the charge state of the battery 416, such as reducing the top speed when the charge state of the battery 416 is low or critically low to conserve power.

In some embodiments, the motor controller 414 may dynamically brake the fleet vehicle 400 using the brake resistor 412 to govern the acceleration of the fleet vehicle 400 based on the operational environment of the fleet vehicle 400. For example, higher traffic congestion may necessitate reduced acceleration in the interest of user and device safety. Acceleration of the fleet vehicle 400 may also be reduced via application of the brake resistor 412 when the charge state of the battery 416 is low or critically low to conserve power. In some embodiments, the motor controller 414 may dynamically brake the fleet vehicle 400 through the brake resistor 412 to limit spinning of the drive wheel on slick surfaces (e.g., wet pavement, dirt, gravel, ice, snow, etc.) due to excessive acceleration. Additionally, or alternatively, the motor controller 414 may dynamically brake the fleet vehicle 400 in a controlled manner to limit or prevent the drive wheel of the fleet vehicle 400 from locking up during braking, thereby maintaining tractive contact of the drive wheel with the road surface, similar to an anti-lock braking system. Further, based on road and/or weather conditions, braking may be adjusted, such as braking sooner, with less pressure, and/or with more constant pressure in wet or raining conditions than in normal conditions. In this manner, the motor controller 414 may be configured to control a traction control characteristic, such as an anti-lock braking characteristic, of the fleet vehicle 400 using the brake resistor 412.

According to one or more embodiments, the motor controller 414 may be configured to control one or more dynamic characteristics of the fleet vehicle 400 using the brake resistor 412 based on a directive received by the fleet vehicle 400, such as from a management server or a fleet servicer/manager. The directive may include a locale specific regulation. For instance, local traffic regulations may set speed limits for city streets, sidewalks, pathways, roads, or highways. In some embodiments, local traffic regulations or ordinances may set speed limits for different vehicle types. In these and other embodiments, the motor controller 414 may dynamically brake the fleet vehicle 400 using the brake resistor 412 to keep within the regulated speed limits or within speed limits based on current road and/or weather conditions. The dynamic braking may change as the fleet vehicle changes position. For instance, aided by GPS navigation, the motor controller 414 may reduce or increase the dynamic braking applied by the brake resistor 412 to match changing speed limits as the fleet vehicle 400 moves from street to street, street to sidewalk, municipality to municipality, or the like. Further, the motor controller 414 may dynamically brake the fleet vehicle 400 based on conditions of the tire(s) and/or weight of the vehicle and rider(s), such that a used tire with low treads and a lighter total weight of the vehicle and rider(s) may result in a lighter brake pressure.

The components of the power system 406 may be arranged in many configurations. For example, the motor 410 may be integrated with the rear wheel 404, such as the rotor of the motor 410 being connected to or integrated with the rim of rear wheel 404 and the stator of the motor 410 positioned around or defining the axle of the rear wheel 404. In some embodiments, the motor 410 may be coupled to the rear wheel 404 via gearing or other mechanical linkages. The battery 416 may be positioned within a compartment of or at least partially define a footboard 426 of the fleet vehicle 400. As shown, the battery 416 may be at least partially disposed at least partially within a vehicle frame space 430 defined between first and second frame members 432, 434 extending in a spaced relationship along opposing sides of the fleet vehicle 400. In such embodiments, the motor controller 414 may be at least partially disposed within the vehicle frame space 430 adjacent to the battery 416, such as between the battery 416 and the rear wheel 404. In some embodiments, the motor controller 414 may be coupled and/or located adjacent to a back or rear wall of the battery 416 or battery case. The brake resistor 412 may also be positioned within the vehicle frame space 430 between the first and second frame members 432, 434. As shown, the brake resistor 412 may be positioned adjacent to the battery 416 on a side opposite of the motor controller 414. For example, the brake resistor 412 may be positioned within the vehicle frame space 430 between the battery 416 and the front wheel 402, such as within a front deck area 436 of the fleet vehicle 400, though other configurations are contemplated. For instance, in some embodiments, the brake resistor 412 may be positioned on a rear portion of the fleet vehicle 400, such as adjacent to the rear wheel 404 and/or the motor 410. Depending on the application, one or more power and/or signal wires may run along or within a portion of the first frame member 432 and/or the second frame member 434. For example, a signal harness may run along the second frame member 434 with motor controller to motor and motor controller to brake resistor lines running along the first frame member 432, or vice versa, or any combination thereof.

Figure 5A:
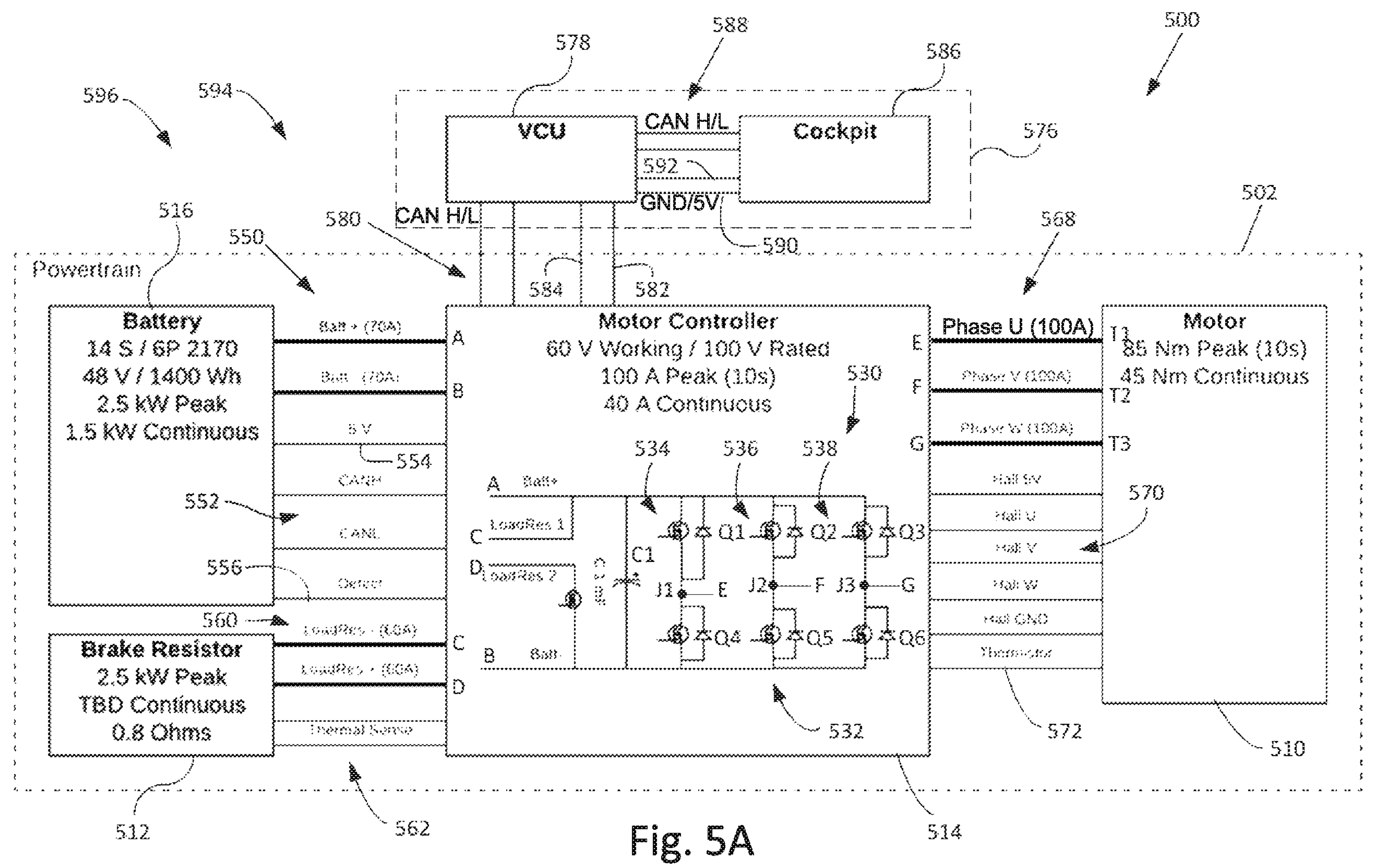
FIG. 5A illustrates a block diagram of a power system for a micro-mobility fleet vehicle and including a circuit architecture configured to electronically couple a battery and brake resistor to a motor in accordance with an embodiment of the disclosure.

FIG. 5A illustrates a block diagram of a power system 500 for a micro-mobility fleet vehicle, such as any of micro-mobility fleet vehicles 110, 110*a-d*, or 400, described above, in accordance with an embodiment of the disclosure. The power system 500 may be similar to the power system 406 of FIG. 4, described above. As shown, the power system 500 includes a powertrain 502. The powertrain 502 includes an electric motor 510, a brake resistor 512, and a motor controller 514 electronically coupling the brake resistor 512 to the motor 510. In some embodiments, the powertrain 502 may include a power source 516 electronically coupled to the motor controller 514. For example, the power source 516 may include a battery, a capacitor, an electrical generator, an AC power source, or a DC power source, among others, or any combination thereof, electronically coupled to the motor controller 514 to provide electrical power to the motor 510. As described herein, the powertrain 502 may provide motive force to the fleet vehicle. For example, the motor 510, as controlled by the motor controller 514 and from power supplied by the power source 516, may drive at least drive wheel (e.g., front wheel 402 and/or rear wheel 404 of FIG. 4, described above) to transport the fleet vehicle from one location to another. For instance, the drive wheel may be configured to provide tractive contact between the micro-mobility fleet vehicle and a road surface. The motor 510, brake resistor 512, motor controller 514, and power source 516 may be respectively similar to the motor 410, brake resistor 412, motor controller 414, and battery 416 of FIG. 4, described above.

Figure 5B:
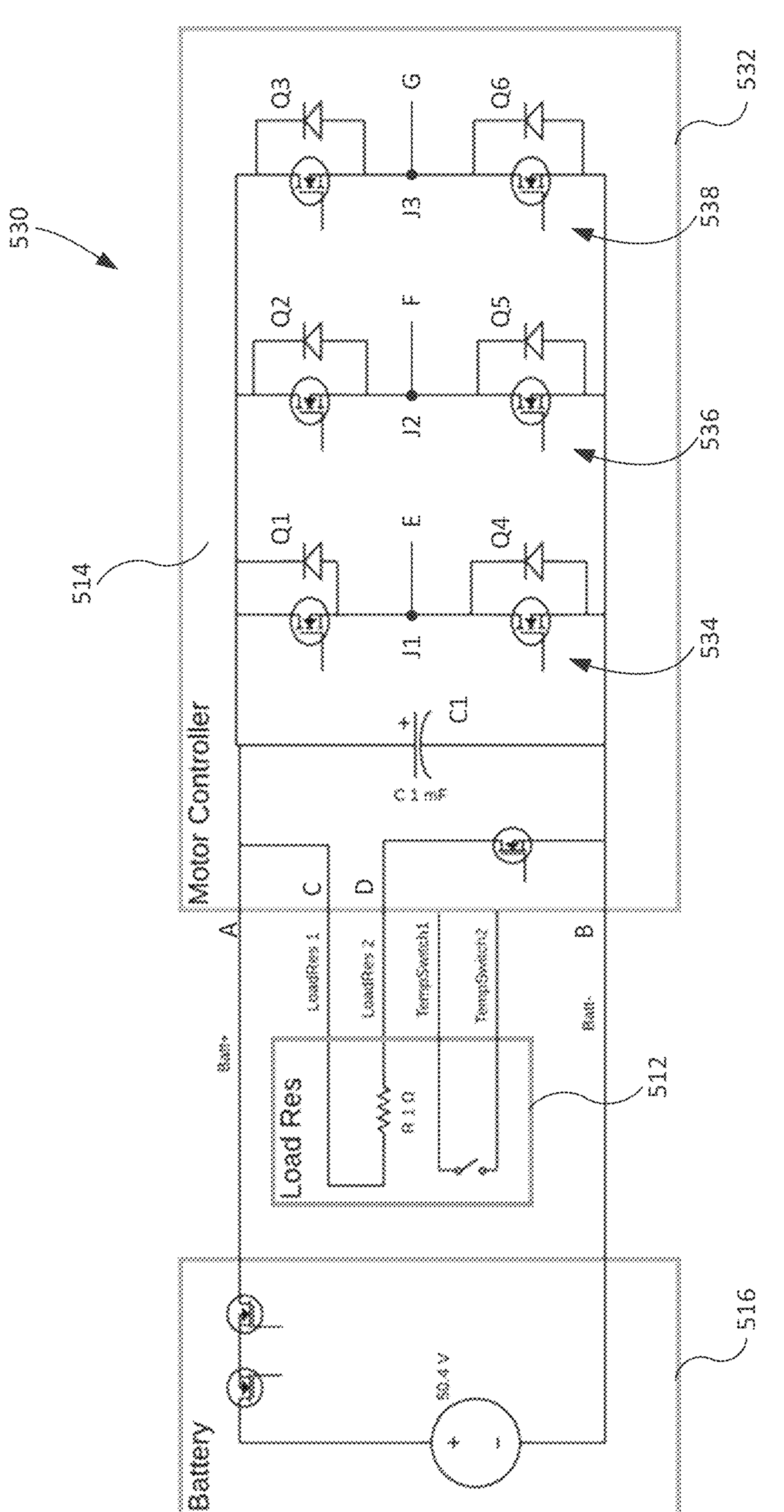
FIG. 5B illustrates a circuit architecture electronically coupling a battery and brake resistor to a motor and motor controller in accordance with an embodiment of the disclosure.

FIG. 5B illustrates a circuit architecture electronically coupling a battery and brake resistor to a motor and motor controller in accordance with an embodiment of the disclosure. As shown in FIGS. 5A and 5B, the motor controller 514 may include a circuit architecture 530 configured to electronically couple the battery 516 and brake resistor 512 to the motor 510. The circuit architecture 530 may include many configurations. For instance, the circuit architecture 530 may include an inverter circuit 532 configured to change a direct current (DC) supplied by the battery 516 to an AC required by the motor 510. As shown, the inverter circuit 532 includes three single-phase inverter switches (e.g., first, second, and third single-phase inverter switches 534, 536, 538) in parallel across a DC source (e.g., battery 516). Each single-phase inverter switch includes two transistors, such as n-channel metal oxide field-effect transistors (MOSFETs) in series, with a junction node therebetween for connection to a load terminal of the motor 510. For example, the first single-phase inverter switch 534 may include a first pair of transistors Q1, Q4 in series and a first junction node J1 therebetween for connection to a first load terminal T1 of the motor 510. The second single-phase inverter switch 536 may include a second pair of transistors Q2, Q5 in series and a second junction node J2 therebetween for connection to a second load terminal T2 of the motor 510. The third single-phase inverter switch 538 may include a third pair of transistors Q3, Q6 in series and a third junction node J3 therebetween for connection to a third load terminal T3 of the motor 510.

The circuit architecture 530 may include other features or circuits. For instance, the inverter circuit 532 may also include a capacitor C1, such as a polarized capacitor across the DC source and in parallel with the first single-phase inverter switch 534, the second single-phase inverter switch 536, and the third single-phase inverter switch 538. The circuit architecture 530 may electronically couple the brake resistor 512 to the inverter circuit 532. For instance, the brake resistor 512 may be connected to the inverter circuit 532 across the battery 516 and in parallel with the capacitor C1, the first single-phase inverter switch 534, the second single-phase inverter switch 536, and the third single-phase inverter switch 538.

With continued reference to FIGS. 5A and 5B, the motor 510, brake resistor 512, and battery 516 may be electronically coupled to the motor controller 514 in many configurations. As shown, the battery 516 may be electronically coupled to the motor controller 514 via a plurality of signal and power wires or connections. For instance, as shown in FIG. 5A, the connection between the battery 516 and the motor controller 514 may include a DC power supply connection 550, a controller area network (CAN) connection 552 (e.g., CAN High (CANH) and CAN Low (CANL) or other differential signal connection) permitting signal communication between the battery 516 and the motor controller 514, a constant 5 V power connection 554, and a detect signal connection 556. Depending on the application, the DC power supply connection 550 may be rated at or about 70 amps (A). As shown, the DC power supply connection may be at locations A and B of the motor controller 514, which correspond to locations A and B of the circuit architecture 530.

Similarly, the brake resistor 512 may be electronically coupled to the motor controller 514 via a plurality of signal and power wires or connections. For example, the connection between the brake resistor 512 and the motor controller 514 may include a load connection 560 and a thermal sense signal connection 562. Depending on the application, the load connection 560 may be rated at or about 60 A. As shown, the load connection 560 may be at locations C and D of the motor controller 514, which correspond to locations C and D of the circuit architecture 530. The thermal sense signal 562 may supply the motor controller 514 with information related to the temperature of the brake resistor 512.

The motor 510 may be electronically coupled to the motor controller 514 via a plurality of signal and power wires or connections. For instance, the connection between the motor 510 and the motor controller 514 may include an AC power supply connection 568, a Hall effect sensor connection 570, and a thermistor signal connection 572. Depending on the application, the AC power supply connection 568 may be rated at or about 100 A. As shown, the AC power supply connection 568 may be at locations E, F, and G of the motor controller 514, which correspond to locations E, F, and G of the circuit architecture 530. The Hall effect sensor connection 570 may supply the motor controller 514 with information regarding the speed and/or position of the motor 510. The Hall effect sensor connection 570 may include separate signals for each phase (U, V, W) of the motor 510, a constant 5V power supply, and a ground connection. The thermistor signal 572 may supply the motor controller 514 with information related to the temperature of the motor 510.

Figure 5C:
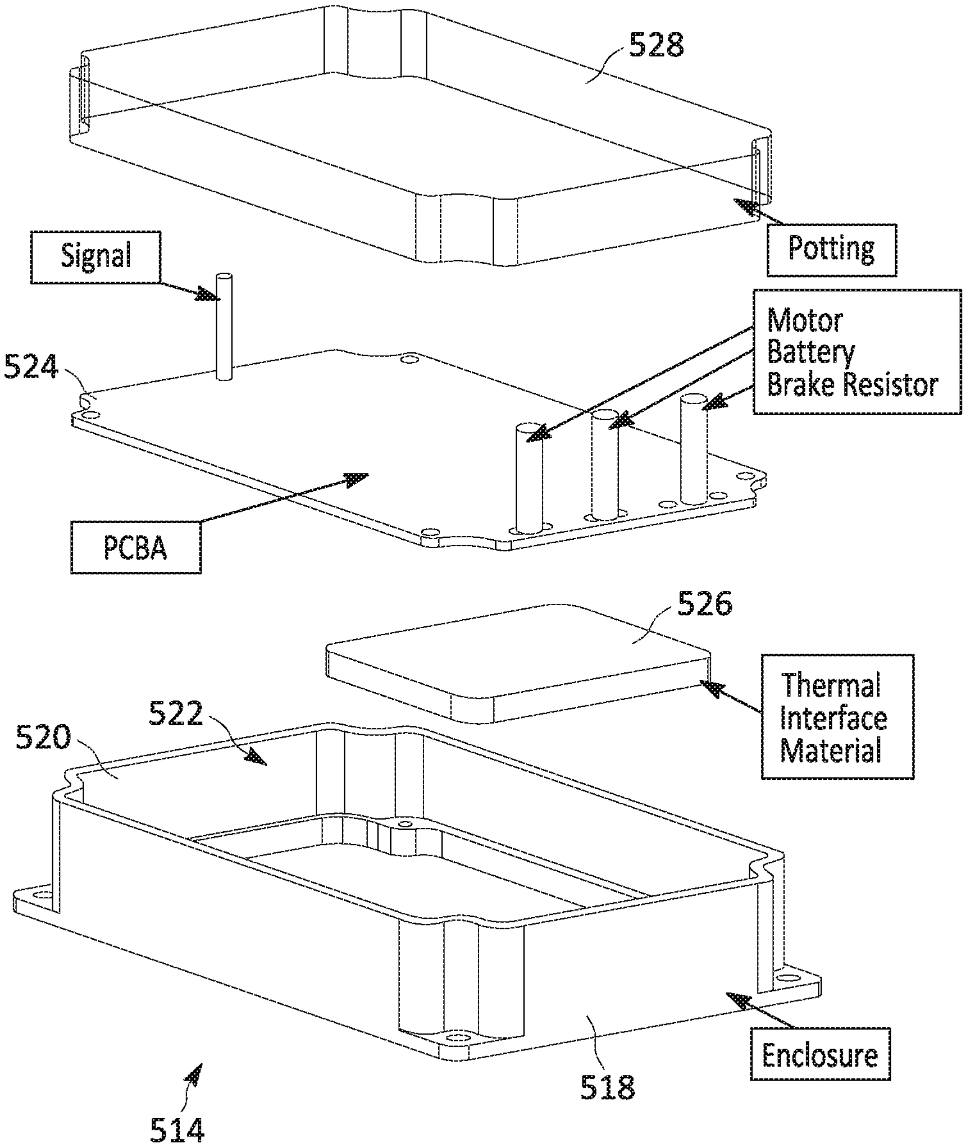
FIG. 5C illustrates a diagram of an architecture for a motor controller in accordance with an embodiment of the disclosure.

FIG. 5C illustrates a diagram of an architecture for the motor controller 514 in accordance with an embodiment of the disclosure. As shown, the motor controller 514 may include a plurality of components, modules, or assemblies assembled together as a unit. For example, the motor controller 514 may include an enclosure 518 with an outer wall 520 defining an interior recess or compartment 522. The motor controller 514 may include one or more components, modules, or assemblies positioned within the interior compartment 522 of the enclosure 518. For instance, the control module 514 may include a printed circuit board assembly (PCBA) 524 with various chipsets, electronics, circuitries, and connectors. Positioned between the PCBA 524 and a bottom of the enclosure 518 may be a thermal interface material 526. In such embodiments, the thermal interface material 526 may provide a heat sink characteristic between the PCBA 524 and the enclosure 518. For example, heat generated by the PCBA 524 (e.g., in various MOSFETs, resistors, or other electronics) may be dissipated to the enclosure 518 via the thermal interface material 526. In such embodiments, the enclosure 518, which may be formed of aluminum material, may be mounted to the frame of the fleet vehicle to further dissipate heat. As shown, one or more power and/or signal wires (e.g., DC power supply connection 550, load connection 560, AC power supply connection 568, etc.) may be soldered directly to the PCBA 524 to minimize packaging size. In some embodiments, the signal lines may have small board level connectors to the PCBA 524. Depending on the application, the entire assembly may be overmolded in potting material 528 to protect the motor controller 514 from contamination. For example, the enclosure 518 may be overmolded in a nylon material providing water ingress protection.

With continued reference to FIG. 5, the power system 500 may include other features for convenience. For instance, the power system 500 may include a control module 576. The control module 576 may be electronically coupled to the motor controller 514 to control the motor controller 514 and/or monitor one or more elements of the powertrain 502 (e.g., the battery 516, the motor 510, and/or the brake resistor 512). As shown, the control module 576 includes a vehicle control unit (VCU) 578. The VCU 578 may be electronically coupled to the motor controller 514 via a plurality of signal and power wires or connections. For example, the connection between the VCU 578 and the motor controller 514 may include a CAN connection 580 (e.g., CANH and CANL) permitting signal communication between the VCU 578 and the motor controller 514, a constant 5 V power connection 582, and a ground connection 584. The VCU 578 may control and/or monitor the status of the motor controller 514. For instance, the VCU 578 may set the speed, torque, power, and/or acceleration limits, described above, as explained in more detail below. The VCU 578 may be disposed within the cockpit assembly 438 of FIGS. 4A-E, described above.

In some embodiments, the control module 576 may include a cockpit interface 586. The cockpit interface 586 may be electronically coupled to the VCU 578 via a plurality of signal and power wires or connections. For example, the connection between the VCU 578 and the cockpit interface 586 may include a CAN connection 588 (e.g., CANH and CANL) permitting signal communication between the VCU 578 and the cockpit interface, a constant 5 V power connection 590, and a ground connection 592. The cockpit interface 586 may monitor one or more controls received from a user during operation of the fleet vehicle. For instance, the cockpit interface 586 may monitor a throttle position, a brake position, a brake pressure, or the like, and pass such information to the motor controller 514 via the VCU 578, as explained below. In some embodiments, the cockpit interface 586 may include a display or user interface, similar to display 444 or user interface 132, described above.

In such embodiments, the display may be configured to render status information of the fleet vehicle to the user. Like the VCU 578, the cockpit interface 586 may be disposed within the cockpit assembly 438 of FIGS. 4A-E, described above. In some embodiments, the cockpit interface 586 may be embodied within the VCU 578 such that the VCU 578 and cockpit interface 586 may be considered one element or module.

In some embodiments, an anti-tamper feature 594 may be defined between a plurality of components of the power system 500. For instance, the anti-tamper feature 594 may be defined between the motor controller 514, the battery 516, and the VCU 578, though other component combinations are contemplated. The anti-tamper feature 594 may be an authentication protocol that verifies the associated components of the power system 500. For instance, the anti-tamper feature 594 may authenticate whether the motor controller 514, the battery 516, and the VCU 578, among others, are verified components approved for use in the power system 500 and/or powertrain 502. In this manner, should one of the components of the power system 500 be replaced with an unverified component, the anti-tamper feature 594 may limit or prevent use of the power system 500, as explained more fully below.

In some embodiments, the anti-tamper feature 594 may limit power provided by the battery 516 to the motor 510 via the motor controller 514 and/or set full dynamic braking of the brake resistor 512 to the motor 510 unless an encrypted verification is completed between the motor controller 514, the battery 516, and the VCU 578. For instance, the anti-tamper feature 594 may include a verification interface 596 configured to verify cryptographically secure component identifiers of the motor controller 514, the battery 516, and the VCU 578. In such embodiments, the verification interface 596 may verify or authenticate the component identifiers of the motor controller 514, the battery 516, and the VCU 578 before the motor controller 514 can provide power to the motor 510 and/or before the dynamic braking of the brake resistor 512 to the motor 510 is released. Depending on the application, the verification interface 596 may be a separate module or component of the power system 500 or may be integrated with one of the motor controller 514, the battery 516, or the VCU 578. For instance, the verification interface 596 may be part of a logic structure of the motor controller 514, the battery 516, or the VCU 578.

During operation, such as before or at startup of the fleet vehicle, the verification interface 596 may detect whether each the motor controller 514, the battery 516, and the VCU 578 includes a cryptographically secure component identifier. If a component identifier is detected, the component identifier may be authenticated against a list of approved component identifiers. If each component identifier of the motor controller 514, the battery 516, and the VCU 578 is authenticated against the list of approved component identifiers, the motor controller 514 may be allowed to provide power from the battery 516 to the motor 510 and/or the dynamic braking provided by the brake resistor 512 may be released. If, however, any of the component identifiers of the motor controller 514, the battery 516, or the VCU 578 cannot be authenticated against the list of approved component identifiers, or if any of the motor controller 514, the battery 516, or the VCU 578 does not include a component identifier, power to the motor 510 may be limited and/or dynamic braking from the brake resistor 512 may be maintained. For instance, if any of the component identifiers cannot be authenticated, or if any of the components do not include a component identifier, power may not be provided to the motor 510 and/or full dynamic braking of the motor 510 may be set to immobilize or restrict use of the fleet vehicle.

In some embodiments, the verification interface 596 may receive an updated list of approved component identifiers. The updated list of approved component identifiers may be received by the verification interface 596 from a memory component. For example, the updated list of approved component identifiers may be provided by a newly installed component of the powertrain 502 or power system 500. For example, through replacement of one of the components of the powertrain 502 or power system 500 (e.g., the battery 516, the VCU 578, the motor controller 514, etc.), the new component may carry a list of approved component identifiers at the time of manufacture, such as within a memory device of the new component. When the new component is installed, the system may be updated with the new list of approved component identifiers within the new component. Additionally, or alternatively, the system (e.g., the battery 516, the motor controller 514, the VCU 578, etc.) may include a removable memory device, such as an SD card, a micro-SD card, a USB flash drive, or the like. In such embodiments, the removable memory device may be removed and updated and/or a new removable memory device with an updated list of approved component identifiers may be installed.

In some embodiments, the updated list of approved component identifiers may be received through an encrypted communication link with a verification server of a fleet servicer, such as management system/server 240 of FIG. 2, described above. For example, at a request by the user or automatically after identification of a non-authenticated component identifier of the motor controller 514, the battery 516, or the VCU 578, the verification interface 596 may query the verification server and receive an updated list of approved component identifiers, if available. In some embodiments, the verification interface 596 may query the verification server to verify an unknown component identifier of at least one of the motor controller 514, the battery 516, and the VCU 578. In such embodiments, the verification server may receive permission from the verification server to allow operation of the unverified component. If permission is not granted by the verification server, however, power may not be provided to the motor 510 and/or full dynamic braking of the motor 510 may be set to immobilize or restrict use of the fleet vehicle.

In some embodiments, the anti-tamper feature 594 may be initiated even if each component identifier is authenticated. For instance, if any component of the power system 500 is tampered with, such as through vandalism or attempted theft, an override command may be given to immobilize or restrict use of the fleet vehicle. In addition, if an attempted theft of the entire fleet vehicle is detected, the override command may also be given to immobilize or restrict use of the fleet vehicle. The anti-tamper feature 594 may also inhibit free motion of the fleet vehicle when not in use or to make the fleet vehicle more difficult to steal or otherwise operate unsafely. For instance, the anti-tamper feature 594 may inhibit free motion of the fleet vehicle when parked or in an inactive state (i.e., without user authentication with the fleet servicer).

Figure 6:
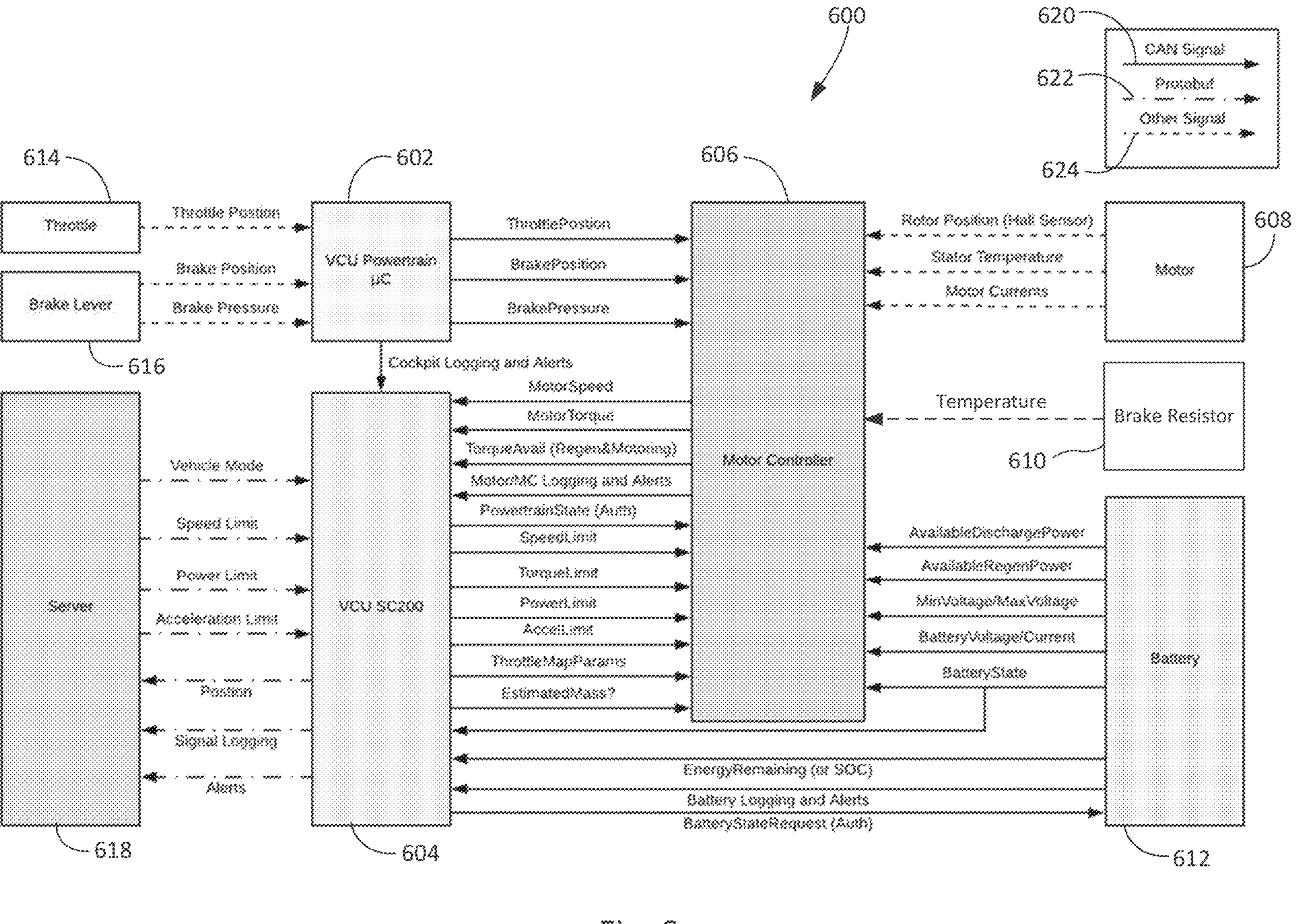
FIG. 6 illustrates a diagram of a signal chain of the power system of FIG. 5 in accordance with an embodiment of the disclosure.

FIG. 6 illustrates a diagram of a signal chain 600 of the power system 500 of FIG. 5 in accordance with an embodiment of the disclosure. The signal chain 600 illustrates the various signals used for real time control of a fleet vehicle, such as any of fleet vehicles 110, 110*a-h*, or 400, described above. As shown, signal chain 600 includes a cockpit interface 602, a VCU 604, a motor controller 606, a motor 608, a brake resistor 610, and a battery 612, which may be similar to the cockpit interface 586, the VCU 578, the motor controller 514, the motor 510, brake resistor 512, and the battery 516 of FIG. 5, described above. Signal chain 600 also includes a throttle 614 and a brake lever 616. In addition, signal chain 600 includes a server 618, which may be similar to the management system/server 240 of FIG. 2, described above.

As shown, the signal chain 600 illustrates various communication signal paths between the throttle 614, brake lever 616, cockpit interface 602, server 618, VCU 604, motor controller 606, motor 608, brake resistor 610, and battery 612. For example, the signal chain 600 may include one or more CAN signals 620, network communication signals 622, and/or other communication signals 624 between the various components. The CAN signals 620 may be part of a CAN bus that enables communication between the various components without dedicated wiring in between. The network communication signals 622 may be networking signals using wireless or other networking protocols (e.g., protobuf), such as via wireless communications module 120, described above. The other communication signals 624 may be dedicated wired connections between the components. For convenience, the different signal types are illustrated in FIG. 6 using different line weights and/or dashing. The CAN signals 620 are represented with a solid line, the network communication signals 622 are represented with a dash-dot line, and the other communication signals 624 are represented with a dash-dash line. The information conveyed through the signal paths are also displayed, though such information is exemplary only. For example, additional or other signals for alerts, logging, and/or control may be sent but are not captured individually in FIG. 6. The signal types are also exemplary only and the communications signal paths may be accomplished through methods other than those depicted in FIG. 6.

Starting at throttle 614, the throttle 614 may communicate a throttle position with the cockpit interface 602 through a dedicated communication signal 624. Brake lever 616 may also communicate a brake position and/or a brake pressure with the cockpit interface 602 through one or more dedicated communication signals 624. In turn, the cockpit interface 602 may communicate the throttle position, brake position, and/or brake pressure to the motor controller 606 through one or more CAN signals 620. The cockpit interface 602 may also communicate with the VCU 604 through a CAN signal. For instance, the cockpit interface 602 may provide cockpit logging and alerts to the VCU 604.

The motor controller 606 and the VCU 604 may be communicatively coupled to each other via one or more CAN signal pathways. The motor controller 606 may provide motor information to the VCU 604. For instance, the motor controller 606 may provide a motor speed, a motor torque, a torque available, and/or motor/motor controller logging and alerts, among others, to the VCU 604 through one or more CAN signals 620. The VCU 604 may provide motor limits to the motor controller 606. For example, the VCU 604 may provide a speed limit, a torque limit, a power limit, and/or an acceleration limit, among others, to the motor controller 606 through one or more CAN signals 620. In some embodiments, the VCU 604 may provide other information and parameters to the motor controller 606. For instance, the VCU 604 may provide throttle map parameters, an estimated mass (of the rider and/or the fleet vehicle), and/or an authenticated powertrain 502 state, among others, to the motor controller 606 through one or more CAN signals 620.

The VCU 604 and the server 618 may be communicatively coupled to each other via one or more network communication signal pathways. For instance, the VCU 604 may provide signal logging, alerts, and/or a position of the fleet vehicle, among others, to the server 618 through one or more network communication signals 622. Simultaneously, or using the information received from the VCU 604, the server 618 may provide a speed limit, a power limit, an acceleration limit, and/or a vehicle mode, among others, to the VCU 604 through one or more network communication signals 622.

The motor 608 and the motor controller 606 may be communicatively coupled to each other via one or more dedicated communication signal pathways. For instance, the motor 608 may provide a rotor position (such as from a Hall effect sensor), a stator temperature, and/or motor currents, among others, to the motor controller 606 using one or more dedicated communication signals 624. Similarly, the brake resistor 610 and the motor controller 606 may be communicatively coupled to each other via one or more dedicated communication signal pathways. For example, the brake resistor 610 may provide a brake resistor temperature to the motor controller 606 through one or more dedicated communication signals 624.

The battery 612 and the motor controller 606 may be communicatively coupled to each other via one or more CAN signal pathways. In some embodiments, the battery 612 may provide an available discharge power, an available regen power, a minimum recorded voltage, a maximum recorded voltage, a battery voltage, a battery current, and/or a battery state, among others, to the motor controller 606 through one or more CAN signals 620.

The battery 612 and the VCU 604 may be communicatively coupled to each other via one or more CAN signal pathways. As shown, the battery 612 may provide a battery state, an energy remaining, a state of charge (SoC), and/or battery logging and alerts, among others, to the VCU 604 through one or more CAN signals 620. In addition, the VCU 604 may provide an authenticated battery state request to the battery 612 through one or more CAN signals 620.

Figure 7:
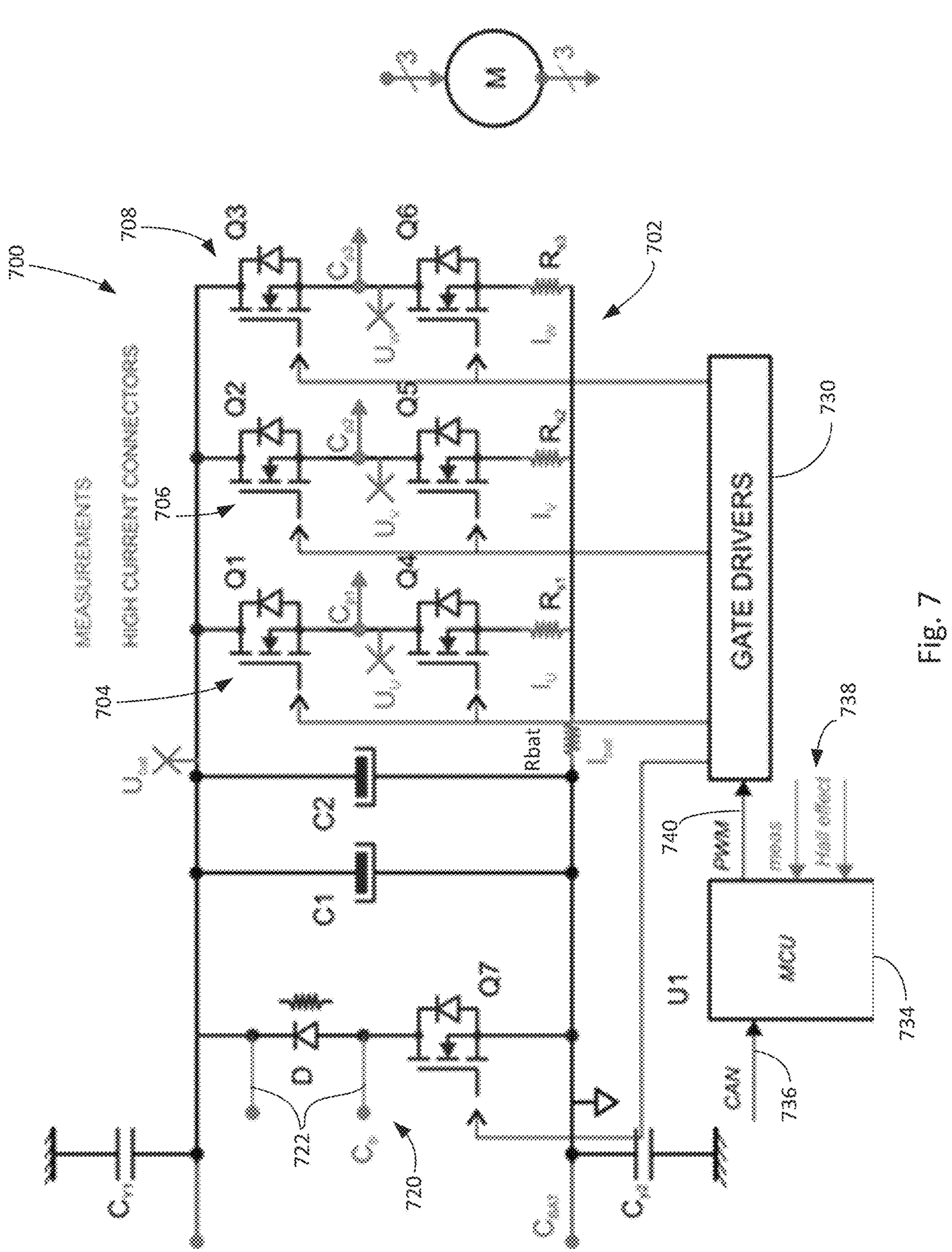
FIG. 7 illustrates a diagram of an additional circuit architecture configured to electronically couple a battery and brake resistor to a motor in accordance with an embodiment of the disclosure.

FIG. 7 illustrates a diagram of an additional circuit architecture 700 configured to electronically couple a battery and brake resistor to a motor in accordance with an embodiment of the disclosure. The circuit architecture 700 includes an inverter circuit 702 including three single-phase inverter switches (e.g., first, second, and third single-phase inverter switches 704, 706, 708) in parallel across a DC source (e.g., battery), with each single-phase inverter switch including two transistors (e.g., n-channel MOSFETs) in series, with a junction node therebetween for connection to a load terminal of a motor. For example, the first single-phase inverter switch 704 may include a first pair of transistors Q1, Q4 in series and a first junction node $C_{p1}$ therebetween for connection to a first load terminal of the motor, the second single-phase inverter switch 706 may include a second pair of transistors Q2, Q5 in series and a second junction node $C_{p2}$ therebetween for connection to a second load terminal of the motor, and the third single-phase inverter switch 708 may include a third pair of transistors Q3, Q6 in series and a third junction node $C_{p3}$ therebetween for connection to a third load terminal of the motor.

Each inverter switch may also include an integrated circuit and a resistor to provide one or more measurements of the inverter switch. Specifically, the first single-phase inverter switch 704 may include a first resister $R_{S1}$ for sensing a first current $I_U$ through a first phase of the motor and a first integrated circuit $U_U$ for monitoring and/or controlling the first phase. The second single-phase inverter switch 706 may include a second resister $R_{S2}$ for sensing a second current $I_V$ through a second phase of the motor and a second integrated circuit $U_V$ for monitoring and/or controlling the second phase. The third single-phase inverter switch 708 may include a third resister $R_{S3}$ for sensing a third current $I_W$ through a third phase of the motor and a third integrated circuit $U_W$ for monitoring and/or controlling the third phase.

The circuit architecture 700 also includes a brake resistor circuit 720. The brake resistor circuit 720 may include a brake resistor connection 722 and a transistor (e.g., a n-channel MOSFET) Q7 in series across the DC source. The brake resistor connection 722 may include the brake resistor connected across a diode D. In FIG. 7, the connection to the brake resistor is represented by $C_b$, and the connection to the battery is represented by $C_{BAT}$.

The circuit architecture 700 may include other features or circuits. For example, the circuit architecture 700 may include a pair of capacitors C1, C2 each connected across the battery in parallel with the first single-phase inverter switch 704, the second single-phase inverter switch 706, and the third single-phase inverter switch 708. The circuit architecture 700 may also include a first capacitor CY1 connected between one side of the circuit and ground, and a second capacitor CY2 connected between the opposite side of the circuit and ground. In some embodiments, the circuit architecture 700 may include a battery integrated circuit $U_{bat}$ connected to one side of the circuit for monitoring and/or controlling the battery. The circuit architecture 700 may also include a battery resistor $R_{bat}$ for sensing a battery current $I_{bat}$ provided by the battery to the inverter circuit 702. In some embodiments, the circuit architecture 700 may include one or more gate drivers 730 connected to the gates of MOSFETs Q1-Q7 to control the transistors. As shown, the circuit architecture 700 may include a motor control unit (MCU) 734, which may be similar to the motor controllers 514, 606 and/or VCUs 578, 604 described above. The MCU 734 may receive control signals 736 (e.g., CAN signals from a VCU, etc.) and measurements 738 from each of the first integrated circuit $U_U$, the second integrated circuit $U_V$, the third integrated circuit $U_W$, the battery integrated circuit $U_{bat}$, the first current $I_U$, the second current $I_V$, the third current $I_W$, the battery current $I_{bat}$, and a Hall effect sensor, or any combination thereof. Using the received measurements and under the direction of the control signals, the MCU 734 may provide a control signal 740 (e.g., a pulse width modulation (PWM) signal) to the one or more gate drivers 730 to control one or more of MOSFETs Q1-Q7.

Figure 8:
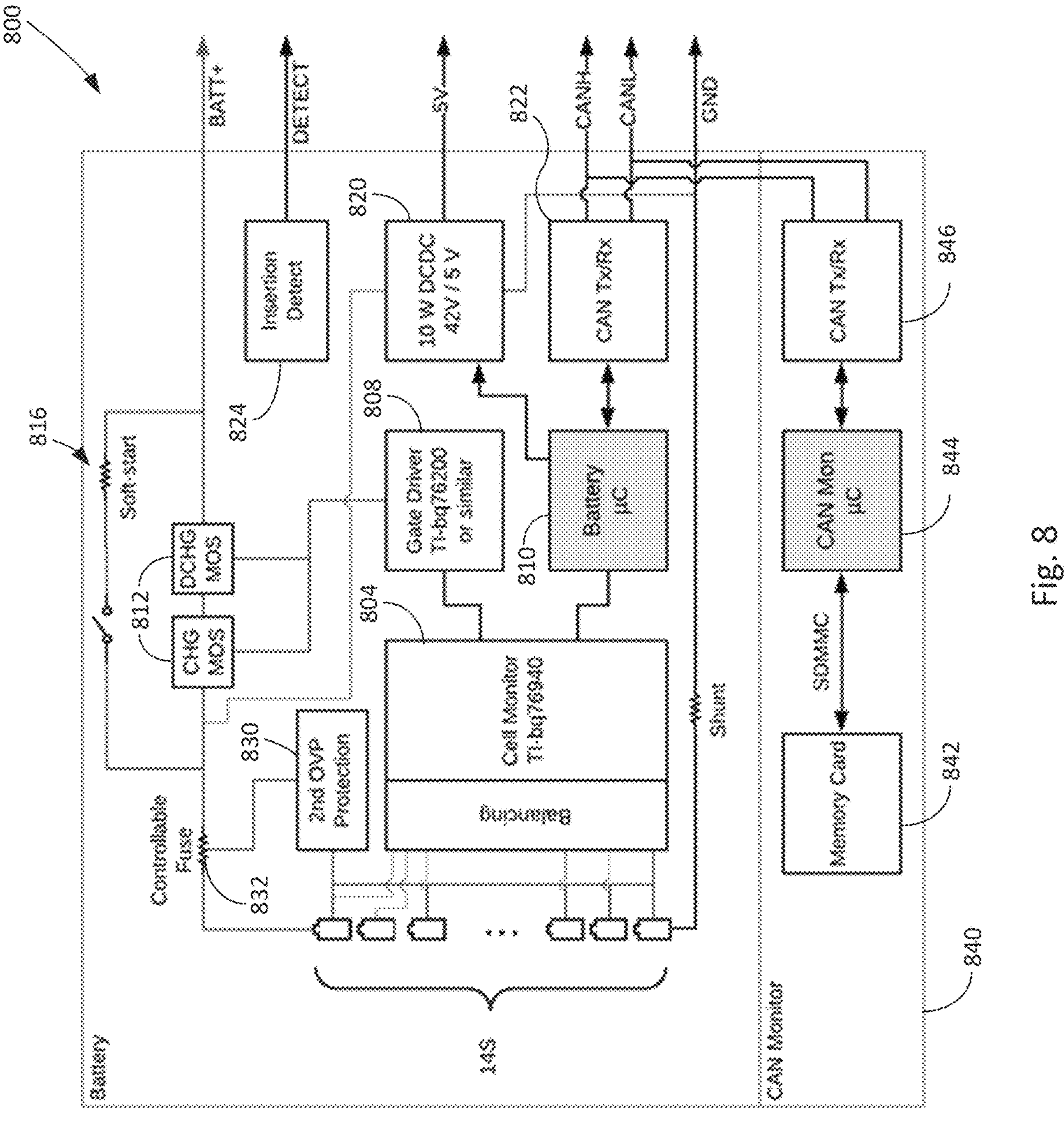
FIG. 8 illustrates a diagram of a battery circuit architecture in accordance with an embodiment of the disclosure.

FIG. 8 illustrates a diagram of a battery circuit architecture 800 in accordance with an embodiment of the disclosure. In some embodiments, the battery circuit architecture 800 may include one or more battery management features. For instance, the battery circuit architecture 800 may support any number of the following features: battery safety, state of charge, state of health, power estimation, energy estimation, thermal modeling, and thermal derating. As shown, the battery circuit architecture 800 may include a cell monitor 804 connected to each cell of the battery to monitor and/or balance the battery cells. Connected to the cell monitor 804 may be a gate driver 808 and a battery manager 810. The gate driver 808 may be connected to one or more transistors (e.g., MOSFETs) 812 to control discharge of the battery. Across the transistors 812 may be a soft start switch 816 to further control a discharge characteristic of the battery. The battery manager 810 may be a logic device or integrated circuit configured to determine the battery's state of charge, state of health, power estimation, energy estimation, thermal modeling, thermal derating, or any combination thereof.

Connected to the battery manager 810 may be a low voltage module 820 and a first signal transmit/receive module 822. The low voltage module 820 may be configured to provide low voltage power for high duty cycle loads. For example, the low voltage module 820 may be rated at 10 W DCDC 42V/5V. The first signal transmit/receive module 822 may be configured to transmit and receive one or more differential signals (e.g., CANH and CANL). For example, the first signal transmit/receive module 822 may receive CAN or other differential signals from the battery manager 810 and transmit CAN or other differential signals to one or more devices connected to the battery.

The battery circuit architecture 800 may include other features or modules. For instance, the battery circuit architecture 800 may include an insertion detect module 824 that provides a signal if the battery is properly inserted or connected. In some embodiments, the battery circuit architecture 800 may include an overvoltage protect (OVP) module or circuit 830 that controls a controllable fuse 832 to protect the battery against an overvoltage condition. In some embodiments the OVP circuit 830 may provide supplemental overvoltage protection of the battery.

In some embodiments, the battery circuit architecture 800 may include a CAN monitor 840. The CAN monitor 840 may include a memory card 842, a CAN manager 844, and a second signal transmit/receive module 846. The CAN manager 844 may monitor and log signals and alerts. In some embodiments, the CAN manager 844 may apply firmware updates to the battery circuit architecture 800. In such embodiments, the memory card 842 may store the firmware updates and/or information regarding the signals/alerts logged by the CAN manager 844. For example, the memory card 842, which may be removable (e.g., an SD card or micro-SD card), may include a key repository of approved component identifiers for the anti-tamper feature 594 described above. The second signal transmit/receive module 846 may be configured to transmit and receive one or more differential signals (e.g., CANH and CANL). For example, the second signal transmit/receive module 846 may receive CAN or other differential signals from the CAN manager 844 and transmit CAN or other differential signals to one or more devices connected to the battery and/or the first signal transmit/receive module 822.

Figure 9:
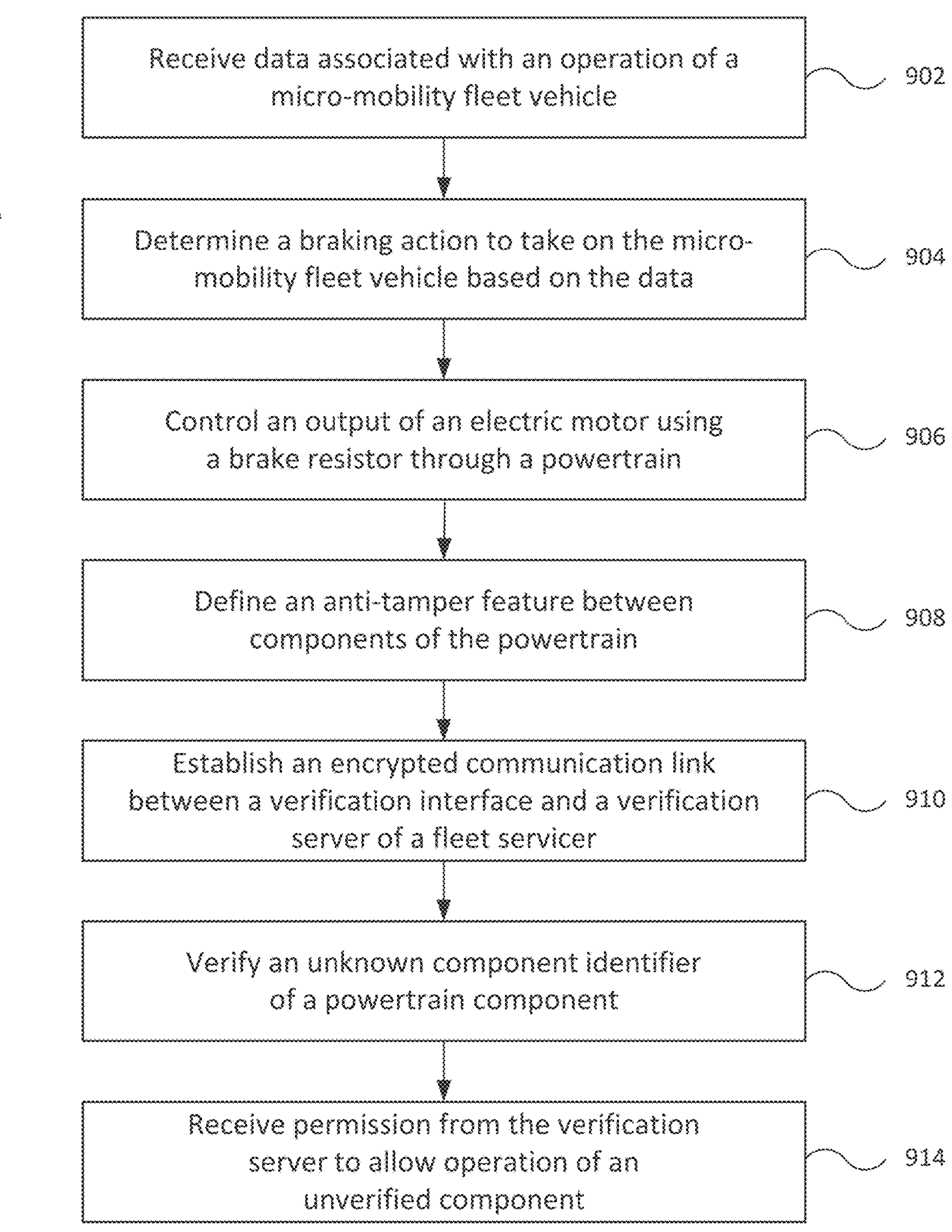
FIG. 9 illustrates a flow diagram of a process of controlling output of an electric motor using a brake resistor in accordance with an embodiment of the disclosure.

FIG. 9 illustrates a flow diagram of a process 900 of controlling output of an electric motor using a brake resistor in accordance with an embodiment of the disclosure. It should be appreciated that any step, sub-step, sub-process, or block of process 900 may be performed in an order or arrangement different from the embodiments illustrated by FIG. 9. For example, one or more blocks may be omitted from or added to the process 900. Although process 900 is described with reference to the embodiments of FIGS. 1-8, process 900 may be applied to other embodiments.

In block 902, process 900 includes receiving data associated with an operation of a micro-mobility fleet vehicle. For instance, a speed, power, power usage or depletion rate, weight, sub-system status, and/or acceleration of the micro-mobility fleet vehicle may be received by a management system of the fleet vehicle (such as a VCU). In some embodiments, data associated with an operational environment of the micro-mobility fleet vehicle may be received by the fleet vehicle's management system. For example, a traffic congestion, a location, an anticipated route, terrain along the route (including conditions of roads, inclines, and/or declines), temperature (both external and of subsystems of the fleet vehicle such as controllers, batteries, processors, brake pads, and tires), and/or charge state, among others, of the fleet vehicle may be received. In some embodiments, the fleet vehicle may receive local traffic regulations setting speed limits for city streets, sidewalks, pathways, roads, or highways. The micro-mobility fleet vehicle may be similar to any of micro-mobility fleet vehicles 110, 110*a-h*, and 400, described above.

In block 904, process 900 includes determining a braking action to take on the micro-mobility fleet vehicle based on the received data. For instance, based on the received data, a braking action may be determined to keep the micro-mobility fleet vehicle within regulated speed limits or within speed limits based on current road and/or weather conditions. In some embodiments, a braking action may be determined to limit spinning of a drive wheel on slick surfaces and/or to limit the drive wheel from locking up during braking. In some embodiments, a braking action may be determined based on conditions of the tire(s) and/or combined weight of the fleet vehicle and rider(s).

In block 906, process 900 includes controlling an output of an electric motor using a brake resistor through a powertrain of the micro-mobility fleet vehicle. The powertrain may include the electric motor, the brake resistor, a motor controller electronically coupling the brake resistor to the motor, a battery electronically coupled to the motor controller, and a VCU electronically coupled to the motor controller. The powertrain may be similar to powertrain 502 of FIG. 5, described above. For instance, the motor, brake resistor, motor controller, battery, and VCU may be similar to motor, brake resistor, motor controller, battery, and VCU of FIG. 5, described above. In addition, or alternatively, the motor, brake resistor, motor controller, battery, and VCU may be similar to motor, brake resistor, motor controller, battery, and VCU of FIG. 6, described above.

In some embodiments, the brake resistor may be used to limit one or more dynamic characteristics of the fleet vehicle. For instance, the brake resistor may be used to limit the speed, acceleration, and/or torque provided by the motor. In some embodiments, the brake resistor may be used to control a traction control characteristic. For instance, the brake resistor may dynamically brake the motor to limit spinning of the fleet vehicle's drive wheel on slick surfaces and/or to limit or prevent the drive wheel from locking up during deceleration. In some embodiments, the brake resistor may dynamically brake the motor based on an operational environment of the fleet vehicle and/or a directive received by the fleet vehicle. For example, the brake resistor may dynamically brake the motor based on traffic congestion, a position of the fleet vehicle (e.g., street vs. sidewalk), and/or to comply with a regulated speed limit or other locale regulations. In some embodiments, the brake resistor may dynamically brake the motor based on a charge state of the battery, such as to conserve energy or power.

In block 908, the process may include defining an anti-tamper feature between components of the powertrain. For example, an authentication protocol may be defined to verify or authenticate the components of the powertrain are approved for use in the powertrain. The anti-tamper feature may limit power provided by the battery to the motor via the motor controller and/or set full dynamic braking of the brake resistor to the motor unless an encrypted verification is completed between at least two different elements of the powertrain. For instance, the anti-tamper feature may include a verification interface configured to verify cryptographically secure component identifiers of the powertrain components. If a component identifier is detected, the component identifier may be authenticated against a list of approved component identifiers. If each component identifier is authenticated against the list of approved component identifiers, the motor controller may be allowed to provide power from the battery to the motor and/or the dynamic braking provided by the brake resistor may be released. If, however, any of the component identifiers cannot be authenticated against the list of approved component identifiers, or if any of the components do not include a component identifier, power to the motor may be limited and/or dynamic braking from the brake resistor may be maintained.

In block 910, the process may include establishing an encrypted communication link between a verification interface and a verification server of a fleet servicer. In block 912, process may include verifying an unknown component identifier of a powertrain component. For example, at a request by the user or automatically after identification of a non-authenticated component identifier, the verification interface may query the verification server and receive an updated list of approved component identifiers, if available. In block 914, process may include receiving permission from the verification server to allow operation of an unverified component. For instance, if the component identifier is not on the list of approved component identifiers, even after receiving an updated list from the verification server, the verification server may still nonetheless provide permission rights for the unverified component. For example, if the powertrain component is from a reputable manufacture, if immobilization of the fleet vehicle would pose a danger to the vehicle and/or the user, and/or if the fleet vehicle is being transported by an employee of the fleet servicer for maintenance, or the like, the verification server may provide temporary permission rights for the unverified component.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method, by one or more processors associated with a micromobility vehicle, comprising:

identifying, based at least in part on a plurality of components of a powertrain of the micromobility vehicle, a plurality of authentication identifiers associated with of the plurality of respective components of the powertrain that are cryptographically secure;

determining that any of the plurality of authentication identifiers fails to be authenticated; and in response to determining that the any of the plurality of authentication identifiers fails to be authenticated, limiting power to a motor of the micromobility vehicle to inhibit free motion of the micromobility vehicle.

2. The method of claim 1, wherein the plurality of components of the powertrain comprises an electric motor, a braking resistor, a motor controller, a battery, and a vehicle control unit (VCU).

3. The method of claim 1, further comprising in response to determining that the any of the plurality of authentication identifiers fails to be authenticated, controlling an output of an electric motor of the micromobility vehicle to affect the operation of the micromobility vehicle, the output of the electric motor being controlled based on a power output of a battery of the micromobility vehicle.

4. The method of claim 1, wherein identifying the plurality of authentication identifiers of the plurality of respective components comprises identifying a respective component identifier associated with each of the plurality of components.

5. The method of claim 1, wherein determining that the any of the plurality of authentication identifiers fails to be authenticated comprises determining whether each of the plurality of authentication identifiers is included within a predetermined list of authentication identifiers.

6. A micromobility vehicle, comprising:

one or more non-transitory computer-readable storage media including instructions; and one or more processors coupled to the one or more non-transitory computer-readable storage media, the one or more processors configured to execute the instructions to:

identify, based at least in part on a plurality of components of a powertrain of the micromobility vehicle, a plurality of authentication identifiers of the plurality of respective components of the powertrain that are cryptographically secure;

determine that any of the plurality of authentication identifiers fails to be authenticated; and in response to determining that the any of the plurality of authentication identifiers fails to be authenticated, limit power to a motor of the micromobility vehicle to inhibit free motion of the micromobility vehicle.

7. The micromobility vehicle of claim 6, wherein the plurality of components of the powertrain comprises an electric motor, a braking resistor, a motor controller, a battery, and a vehicle control unit (VCU).

8. The micromobility vehicle of claim 6, wherein the instructions further comprise instructions to:

in response to determining that the any of the plurality of authentication identifiers fails to be authenticated, control an output of an electric motor of the micromobility vehicle to affect the operation of the micromobility vehicle, the output of the electric motor being controlled based on a power output of a battery of the micromobility vehicle.

9. The micromobility vehicle of claim 6, wherein the instructions to identify the plurality of authentication identifiers of the plurality of respective components further comprise instructions to identify a respective component identifier associated with each of the plurality of components.

10. The micromobility vehicle of claim 6, wherein the instructions to determine that the any of the plurality of authentication identifiers fails to be authenticated further comprise instructions to determine whether each of the plurality of authentication identifiers is included within a predetermined list of authentication identifiers.

11. A non-transitory computer-readable medium comprising instructions that, when executed by one or more processors, cause the one or more processors to:

identify, based at least in part on a plurality of components of a powertrain of the micromobility vehicle, a plurality of authentication identifiers of the plurality of respective components of the powertrain that are cryptographically secure;

determine that any of the plurality of authentication identifiers fails to be authenticated; and in response to determining that the any of the plurality of authentication identifiers fails to be authenticated, limit power to a motor of the micromobility vehicle to inhibit free motion of the micromobility vehicle.

12. The non-transitory computer-readable medium of claim 11, wherein the plurality of components of the powertrain comprises an electric motor, a braking resistor, a motor controller, a battery, and a vehicle control unit (VCU).

13. The non-transitory computer-readable medium of claim 11, wherein the instructions further comprise instructions to:

in response to determining that the any of the plurality of authentication identifiers fails to be authenticated, control an output of an electric motor of the micromobility vehicle to affect the operation of the micromobility vehicle, the output of the electric motor being controlled based on a power output of a battery of the micromobility vehicle.

14. The non-transitory computer-readable medium of claim 11, wherein the instructions to identify the plurality of authentication identifiers of the plurality of respective components further comprise instructions to identify a respective component identifier associated with each of the plurality of components.

15. The non-transitory computer-readable medium of claim 11, wherein the instructions to determine that the any of the plurality of authentication identifiers fails to be authenticated further comprise instructions to determine whether each of the plurality of authentication identifiers is included within a predetermined list of authentication identifiers.

* * * * *